United States Patent
Marsh et al.

(10) Patent No.: US 12,169,237 B2
(45) Date of Patent: Dec. 17, 2024

(54) VEHICLE REQUEST FOR SENSOR DATA WITH SENSOR DATA FILTERING CONDITION

(71) Applicant: QUALCOMM Incorporated, San Diego, CA (US)

(72) Inventors: Gene Wesley Marsh, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 17/217,035

(22) Filed: Mar. 30, 2021

(65) Prior Publication Data

US 2021/0311183 A1   Oct. 7, 2021

Related U.S. Application Data

(60) Provisional application No. 63/003,849, filed on Apr. 1, 2020.

(51) Int. Cl.
*G01S 13/931* (2020.01)
*B60W 30/08* (2012.01)
(Continued)

(52) U.S. Cl.
CPC .......... *G01S 13/931* (2013.01); *B60W 30/08* (2013.01); *G01S 13/865* (2013.01); *G01S 13/867* (2013.01);
(Continued)

(58) Field of Classification Search
CPC .... G01S 13/931; G01S 13/865; G01S 13/867; G01S 17/931; G01S 17/87; B60W 30/08;
(Continued)

(56) References Cited

U.S. PATENT DOCUMENTS

| 9,805,601 B1 | 10/2017 | Fields et al. |
| 10,178,531 B2 | 1/2019 | Nguyen et al. |
| (Continued) | | |

FOREIGN PATENT DOCUMENTS

| CN | 103562692 A | 2/2014 |
| EP | 3364394 A1 | 8/2018 |
| WO | 2018052749 A1 | 3/2018 |

OTHER PUBLICATIONS

International Search Report and Written Opinion—PCT/US2021/025208—ISA/EPO—Jun. 29, 2021.

*Primary Examiner* — Ig T An
(74) *Attorney, Agent, or Firm* — QUALCOMM Incorporated

(57) ABSTRACT

In an aspect, a vehicle apparatus monitors, via a set of sensors communicatively coupled to the vehicle apparatus, a field of view (FOV) of the vehicle apparatus. The vehicle apparatus transmits, based on the monitoring, a first message that requests sensor data from one or more neighboring devices and indicates at least one sensor data filtering condition for the requested sensor data. A communication device receives the first message, and determines whether sensor data is available at the communication device which satisfies the at least one sensor data filtering condition for the requested sensor data. If so, the communication device filters its sensor data based on the at least one sensor data filtering condition, and transmits, to the vehicle apparatus, a second message including the filtered sensor data.

8 Claims, 17 Drawing Sheets

(51) Int. Cl.
*G01S 13/86* (2006.01)
*G01S 17/931* (2020.01)

(52) U.S. Cl.
CPC ...... *G01S 17/931* (2020.01); *B60W 2420/403* (2013.01); *B60W 2420/408* (2024.01); *B60W 2556/65* (2020.02); *B60W 2756/10* (2020.02); *G01S 2013/9322* (2020.01)

(58) Field of Classification Search
CPC ....... B60W 2420/403; B60W 2420/52; B60W 2556/65; B60W 2756/10; B60W 2554/4048; H04W 4/90
See application file for complete search history.

(56) References Cited

U.S. PATENT DOCUMENTS

| | | | |
|---|---|---|---|
| 10,643,084 B2* | 5/2020 | Qin | G06V 10/764 |
| 2018/0005407 A1* | 1/2018 | Browning | G05D 1/024 |
| 2018/0365909 A1* | 12/2018 | Cheng | H04Q 9/00 |
| 2019/0256091 A1* | 8/2019 | Lepp | G08G 1/143 |
| 2020/0074735 A1* | 3/2020 | Nowakowski | B60R 1/24 |
| 2020/0111364 A1* | 4/2020 | Damsaz | G08G 1/0962 |

* cited by examiner

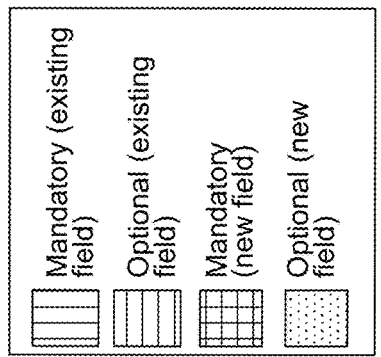

| SensorSharing Message Part | Data Frame | Element Name | Contents (DF, DE) | Description | Host Entity | Detected Object |
|---|---|---|---|---|---|---|
| Part I (Host Data) | Core Data | msgCnt | DE_MsgCount | Sequence number | x | |
| | | StationType | ParticipantType | Transmitter type (Unknown, motor, non motor, pedestrian, RSU, other) | | |
| | | id | OCTET STRING | Transmitter ID | x | |
| | | refPos | Position3D | Transmitter latitude, longitude elevation | x | |
| | | accuracy | DF_PositionConfidenceSet | Latitude, Longitude, Elevation position confidence | x | |
| | | secMark | DSecond | Time of message generation | x | |
| | | objCount | DE_DetectedObjectCount | Number of detected objects included in Msg_SensorSharing | x | |
| | | detObj | DF_DetectedObject | Sequence of DetectedObject (objects detected by transmitting OBU or RSU) | x | |

*FIG. 10A*

| | | | | | Description |
|---|---|---|---|---|---|
| Part II (Detected Object) | Common Data Extension | ptcType | ParticipantType | X | Detected object type(Unknown, motor, non-motor, pedestrian, RSU, other) |
| | | ptcId | INTEGER | X | temporary ID set by transmitting OBU or RSU. 0 for transmitter itself. 1..255 for objects |
| | | source | SourceType | X | Unknown, V2X, Video, Radar, Loop |
| | | secMark | DSecond | X | Time of perception |
| | | pos | PositionOffsetLLV | X | Latitude, longitude, vertical offset |
| | | accuracy | DF_PositionConfidenceSet | X | DE_PositionConfidence (xy), DE_ElevationConfidence |
| | | speed | DE_Speed | X | xy-speed |
| | | verSpeed | DF_VerticalSpeed | X | Vertical speed and accuracy |
| | | heading | DE_Heading | X | Heading in degrees from North |
| | Vehicle Data Extension | accelSet | DF_AccelerationSet4Way | X | Latitude, Longitude, Vertical, Yaw Rate |
| | | transmission | DE_TransmissionState | X | Current vehicle transmission state (gear) |
| | | motionCfd | MotionConfidenceSet | X | SpeedConfidence, HeadingConfidence, SteeringWheelAngleConfidence |
| | | id | OCTET STRING | X | Vehicle id or motorcycle id |
| | | angle | DE_SteeringWheelAngle | X | |
| | | plateNo | OCTET STRING | X | |

FIG. 10B

| Section | Field | Type | Description | X |
|---|---|---|---|---|
| Part II (Detected Object) / Vehicle Data Extension | vehSize | DF_VehicleSize | VehicleWidth, VehicleLength, VehicleHeight | X |
| | vehicleClass | VehicleClassification | Includes BasicVehicleClass and other extendible type | X |
| | pathHistory | DF_PathHistory | | X |
| | pathPrediction | DF_PathPrediction | | X |
| | lights | DE_ExteriorLights | | X |
| | vehAttitude | DF_Attitude | Vehicle pitch, roll, yaw and associated confidence values | X |
| | vehAngVel | DF_AngularVelocity | Vehicle pitch rate, roll rate and associated confidence values | X |
| Part II (Detected Object) / VRU Data Extension | basicType | PersonalDeviceUserType | | X |
| | propulsion | PropelledInformation | | X |
| | useState | PersonalDeviceUsageState | | X |
| | crossRequest | PersonalCrossingRequest | | X |
| | crossState | PersonalCrossingInProgress | | X |
| | clusterSize | NumberOfParticipantsInCluster | | X |
| | clusterRadius | PersonalClusterRadius | | X |
| | eventResponderType | PublicSafetyEventResponderType | | X |
| | activityType | PublicSafetyAndRoadWorkerActivity | | X |
| | activitySubType | PublicSafetyDirectingTrafficSubType | | X |

FIG. 10C

| | | | | | |
|---|---|---|---|---|---|
| Part II (Detected Object) | VRU Data Extension | assistType | PersonalAssistive | | X |
| | | objSize | DF_ObjectSize | VRU length, VRU width, VRU height | X |
| | | pathHistory | DF_PathHistory | | X |
| | | pathPrediction | DF_PathPrediction | | X |
| | Obstacle Data Extension | objSize | DF_ObjectSize | Object length, object width object height | X |
| | | objClass | DF_ObjectClassification | Enumerated list | X |
| Part IV (OcclusionRegion) | Occluded Region Extension | OcclusCount | DE_OcclusionCount | Number of 2D occlusion regions included (1..15) | X |
| | | OcclusAngle | DF_OcclusionAngle | Start, stop angle of occluded region | X |

← Occlusion Information Elements

FIG. 10D

VEHICLE REQUEST FOR SENSOR DATA WITH SENSOR DATA FILTERING CONDITION

CROSS-REFERENCE TO RELATED APPLICATIONS

The present Application for Patent claims the benefit of U.S. Provisional Application No. 63/003,849, entitled "VEHICLE REQUEST FOR SENSOR DATA WITH SENSOR DATA FILTERING CONDITION," filed Apr. 1, 2020, assigned to the assignee hereof, and expressly incorporated herein by reference in its entirety.

INTRODUCTION

Aspects of this disclosure relate generally to a vehicle request for sensor data with at least one sensor data filtering condition.

Many vehicles manufactured today are equipped with numerous sensors, including cameras, radar, Light Detection and Ranging (LIDAR) and ultrasound. These sensors are used to detect environment about the car, including other vehicles, obstacles and vulnerable road users (VRUs), such as pedestrians, cyclists, etc. To address instances where vehicle sensors are subject to occlusion, or objects are beyond the range of a vehicle's sensors, standards bodies, including SAE, ETSI-ETS and CSAE, are defining application-layer standards for vehicle-to-everything (V2X) sensor-sharing, or the dissemination of detected vehicles and/or objects. These standards are applicable to any V2X entity, including vehicles, infrastructure Road Side Units (RSUs) and V2X-equipped mobile devices.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a vehicle apparatus includes monitoring, via a set of sensors communicatively coupled to the vehicle apparatus, a field of view (FOV) of the vehicle apparatus; and transmitting, based on the monitoring, a first message that requests sensor data from one or more neighboring devices and indicates at least one sensor data filtering condition for the requested sensor data.

In some aspects, the at least one sensor data filtering condition specifies at least one region where sensor data is desired, or the at least one sensor data filtering condition specifies at least one region where sensor data is not desired, or a combination thereof.

In some aspects, the method includes detecting a first occluded region within the FOV based on the monitoring, wherein the at least one sensor data filtering condition for the requested sensor data includes an indication of the first occluded region as a region where sensor data is desired.

In some aspects, the first occluded region corresponds to a 2D region or 3D region, or the first occluded region is based on one or more angular ranges relative to one or more reference points, or any combination thereof.

In some aspects, the method includes detecting a second occluded region within the FOV of the vehicle apparatus based on the monitoring, wherein the at least one sensor data filtering condition for the requested sensor data includes an indication of the second occluded region as another region where sensor data is desired.

In some aspects, the method includes receiving, from at least one of the one or more neighboring communication devices in response to the first message, a second message that includes information that is based on sensor data collected at the at least one neighboring communication device and is filtered based on the at least one sensor data filtering condition.

In some aspects, relative to a vehicle associated with the vehicle apparatus, the at least one neighboring communication device is associated with a neighboring vehicle, a neighboring vulnerable road user (VRU), or a neighboring roadside unit (RSU).

In some aspects, the transmitting transmits the first message via a vehicle-to-vehicle (V2V) protocol or vehicle-to-everything (V2X) protocol.

In some aspects, the first message is an application-layer message.

In an aspect, a method of operating a communication device includes receiving, from a vehicle apparatus that neighbors the communication device, a first message that requests sensor data associated with a field of view (FOV) of the vehicle apparatus and that indicates at least one sensor data filtering condition for the requested sensor data; and determining, in response to the first message, whether sensor data is available at the communication device which satisfies the at least one sensor data filtering condition for the requested sensor data.

In some aspects, the at least one sensor data filtering condition specifies at least one region where sensor data is desired, or the at least one sensor data filtering condition specifies at least one region where sensor data is not desired, or a combination thereof.

In some aspects, the at least one sensor data filtering condition for the requested sensor data includes an indication of a first occluded region as a region where sensor data is desired.

In some aspects, the first occluded region corresponds to a 2D region or 3D region, or the first occluded region is based on one or more angular ranges relative to one or more reference points, or any combination thereof.

In some aspects, the at least one sensor data filtering condition for the requested sensor data further includes an indication of a second occluded region as another region where sensor data is desired.

In some aspects, the determining determines that sensor data is available at the communication device which satisfies the at least one sensor data filtering condition for the requested sensor data, further comprising: filtering, based on the at least one sensor data filtering condition, sensor data obtained at the communication device via a set of sensors communicatively coupled to the communication device; and transmitting, to the vehicle apparatus, a second message including the filtered sensor data.

In some aspects, the transmitting transmits the second message via a vehicle-to-vehicle (V2V) protocol or vehicle-to-everything (V2X) protocol.

In some aspects, the first message is an application-layer message.

In some aspects, relative to a vehicle associated with the vehicle apparatus, the communication device is associated with a neighboring vehicle, a neighboring vulnerable road user (VRU), or a neighboring roadside unit (RSU).

In some aspects, the request for the sensor data and the at least one sensor data filtering condition is included in the first message expressly.

In some aspects, the request for the sensor data and the at least one sensor data filtering condition is included in the first message implicitly.

In some aspects, the first message comprises a location of the vehicle apparatus, further comprising: detecting at least one occluded region in the FOV of the vehicle apparatus based on the location of the vehicle apparatus, wherein the detected at least one occluded region is interpreted by the communication device as an implicit request for sensor data in the at least one occluded region.

In some aspects, the first message comprises sensor data that depicts at least part of the FOV of the vehicle apparatus, further comprising: detecting at least one occluded region in the FOV of the vehicle apparatus based on the sensor data in the first message, wherein the detected at least one occluded region is interpreted by the communication device as an implicit request for sensor data in the at least one occluded region.

In an aspect, a vehicle apparatus includes a memory; a communication interface; and at least one processor communicatively coupled to the memory and the communication interface, the at least one processor configured to: monitor, via a set of sensors communicatively coupled to the vehicle apparatus, a field of view (FOV) of the vehicle apparatus; and cause the communication interface to transmit, based on the monitoring, a first message that requests sensor data from one or more neighboring devices and indicates at least one sensor data filtering condition for the requested sensor data.

In some aspects, the at least one sensor data filtering condition specifies at least one region where sensor data is desired, or the at least one sensor data filtering condition specifies at least one region where sensor data is not desired, or a combination thereof.

In some aspects, the at least one processor is further configured to: detect a first occluded region within the FOV based on the monitoring, wherein the at least one sensor data filtering condition for the requested sensor data includes an indication of the first occluded region as a region where sensor data is desired.

In some aspects, the first occluded region corresponds to a 2D region or 3D region, or the first occluded region is based on one or more angular ranges relative to one or more reference points, or any combination thereof.

In some aspects, the at least one processor is further configured to: detect a second occluded region within the FOV of the vehicle apparatus based on the monitoring, wherein the at least one sensor data filtering condition for the requested sensor data includes an indication of the second occluded region as another region where sensor data is desired.

In some aspects, the at least one processor is further configured to: receive, via the communication interface, from at least one of the one or more neighboring communication devices in response to the first message, a second message that includes information that is based on sensor data collected at the at least one neighboring communication device and is filtered based on the at least one sensor data filtering condition.

In some aspects, relative to a vehicle associated with the vehicle apparatus, the at least one neighboring communication device is associated with a neighboring vehicle, a neighboring vulnerable road user (VRU), or a neighboring roadside unit (RSU).

In some aspects, the transmitting transmits the first message via a vehicle-to-vehicle (V2V) protocol or vehicle-to-everything (V2X) protocol.

In some aspects, the first message is an application-layer message.

In an aspect, a communication device includes a memory; a communication interface; and at least one processor communicatively coupled to the memory and the communication interface, the at least one processor configured to: receive, via the communication interface, from a vehicle apparatus that neighbors the communication device, a first message that requests sensor data associated with a field of view (FOV) of the vehicle apparatus and that indicates at least one sensor data filtering condition for the requested sensor data; and determine, in response to the first message, whether sensor data is available at the communication device which satisfies the at least one sensor data filtering condition for the requested sensor data.

In some aspects, the at least one sensor data filtering condition specifies at least one region where sensor data is desired, or the at least one sensor data filtering condition specifies at least one region where sensor data is not desired, or a combination thereof.

In some aspects, the at least one sensor data filtering condition for the requested sensor data includes an indication of a first occluded region as a region where sensor data is desired.

In some aspects, the first occluded region corresponds to a 2D region or 3D region, or the first occluded region is based on one or more angular ranges relative to one or more reference points, or any combination thereof.

In some aspects, the at least one sensor data filtering condition for the requested sensor data further includes an indication of a second occluded region as another region where sensor data is desired.

In some aspects, the determining determines that sensor data is available at the communication device which satisfies the at least one sensor data filtering condition for the requested sensor data, further comprising: filtering, based on the at least one sensor data filtering condition, sensor data obtained at the communication device via a set of sensors communicatively coupled to the communication device; and transmitting, to the vehicle apparatus, a second message including the filtered sensor data.

In some aspects, the transmitting transmits the second message via a vehicle-to-vehicle (V2V) protocol or vehicle-to-everything (V2X) protocol.

In some aspects, the first message is an application-layer message.

In some aspects, relative to a vehicle associated with the vehicle apparatus, the communication device is associated with a neighboring vehicle, a neighboring vulnerable road user (VRU), or a neighboring roadside unit (RSU).

In some aspects, the request for the sensor data and the at least one sensor data filtering condition is included in the first message expressly.

In some aspects, the request for the sensor data and the at least one sensor data filtering condition is included in the first message implicitly.

In some aspects, the first message comprises a location of the vehicle apparatus, further comprising: detect at least one occluded region in the FOV of the vehicle apparatus based on the location of the vehicle apparatus, wherein the detected at least one occluded region is interpreted by the communication device as an implicit request for sensor data in the at least one occluded region.

In some aspects, the first message comprises sensor data that depicts at least part of the FOV of the vehicle apparatus, further comprising: detect at least one occluded region in the FOV of the vehicle apparatus based on the sensor data in the first message, wherein the detected at least one occluded region is interpreted by the communication device as an implicit request for sensor data in the at least one occluded region.

In an aspect, a vehicle apparatus includes means for monitoring, via a set of sensors communicatively coupled to the vehicle apparatus, a field of view (FOV) of the vehicle apparatus; and means for transmitting, based on the monitoring, a first message that requests sensor data from one or more neighboring devices and indicates at least one sensor data filtering condition for the requested sensor data.

In some aspects, the at least one sensor data filtering condition specifies at least one region where sensor data is desired, or the at least one sensor data filtering condition specifies at least one region where sensor data is not desired, or a combination thereof.

In some aspects, the method includes means for detecting a first occluded region within the FOV based on the monitoring, wherein the at least one sensor data filtering condition for the requested sensor data includes an indication of the first occluded region as a region where sensor data is desired.

In some aspects, the first occluded region corresponds to a 2D region or 3D region, or the first occluded region is based on one or more angular ranges relative to one or more reference points, or any combination thereof.

In some aspects, the method includes means for detecting a second occluded region within the FOV of the vehicle apparatus based on the monitoring, wherein the at least one sensor data filtering condition for the requested sensor data includes an indication of the second occluded region as another region where sensor data is desired.

In some aspects, the method includes means for receiving, from at least one of the one or more neighboring communication devices in response to the first message, a second message that includes information that is based on sensor data collected at the at least one neighboring communication device and is filtered based on the at least one sensor data filtering condition.

In some aspects, relative to a vehicle associated with the vehicle apparatus, the at least one neighboring communication device is associated with a neighboring vehicle, a neighboring vulnerable road user (VRU), or a neighboring roadside unit (RSU).

In some aspects, the transmitting transmits the first message via a vehicle-to-vehicle (V2V) protocol or vehicle-to-everything (V2X) protocol.

In some aspects, the first message is an application-layer message.

In an aspect, a communication device includes means for receiving, from a vehicle apparatus that neighbors the communication device, a first message that requests sensor data associated with a field of view (FOV) of the vehicle apparatus and that indicates at least one sensor data filtering condition for the requested sensor data; and means for determining, in response to the first message, whether sensor data is available at the communication device which satisfies the at least one sensor data filtering condition for the requested sensor data.

In some aspects, the at least one sensor data filtering condition specifies at least one region where sensor data is desired, or the at least one sensor data filtering condition specifies at least one region where sensor data is not desired, or a combination thereof.

In some aspects, the at least one sensor data filtering condition for the requested sensor data includes an indication of a first occluded region as a region where sensor data is desired.

In some aspects, the first occluded region corresponds to a 2D region or 3D region, or the first occluded region is based on one or more angular ranges relative to one or more reference points, or any combination thereof.

In some aspects, the at least one sensor data filtering condition for the requested sensor data further includes an indication of a second occluded region as another region where sensor data is desired.

In some aspects, the determining determines that sensor data is available at the communication device which satisfies the at least one sensor data filtering condition for the requested sensor data, further comprising: filtering, based on the at least one sensor data filtering condition, sensor data obtained at the communication device via a set of sensors communicatively coupled to the communication device; and transmitting, to the vehicle apparatus, a second message including the filtered sensor data.

In some aspects, the transmitting transmits the second message via a vehicle-to-vehicle (V2V) protocol or vehicle-to-everything (V2X) protocol.

In some aspects, the first message is an application-layer message.

In some aspects, relative to a vehicle associated with the vehicle apparatus, the communication device is associated with a neighboring vehicle, a neighboring vulnerable road user (VRU), or a neighboring roadside unit (RSU).

In some aspects, the request for the sensor data and the at least one sensor data filtering condition is included in the first message expressly.

In some aspects, the request for the sensor data and the at least one sensor data filtering condition is included in the first message implicitly.

In some aspects, the first message comprises a location of the vehicle apparatus, further comprising: means for detecting at least one occluded region in the FOV of the vehicle apparatus based on the location of the vehicle apparatus, wherein the detected at least one occluded region is interpreted by the communication device as an implicit request for sensor data in the at least one occluded region.

In some aspects, the first message comprises sensor data that depicts at least part of the FOV of the vehicle apparatus, further comprising: means for detecting at least one occluded region in the FOV of the vehicle apparatus based on the sensor data in the first message, wherein the detected at least one occluded region is interpreted by the communication device as an implicit request for sensor data in the at least one occluded region.

In an aspect, a non-transitory computer-readable medium storing computer-executable instructions that, when executed by a vehicle apparatus, cause the vehicle apparatus to: monitor, via a set of sensors communicatively coupled to the vehicle apparatus, a field of view (FOV) of the vehicle apparatus; and transmit, based on the monitoring, a first message that requests sensor data from one or more neighboring devices and indicates at least one sensor data filtering condition for the requested sensor data.

In some aspects, the at least one sensor data filtering condition specifies at least one region where sensor data is desired, or the at least one sensor data filtering condition specifies at least one region where sensor data is not desired, or a combination thereof.

In some aspects, the one or more instructions further cause the vehicle apparatus to: detect a first occluded region within the FOV based on the monitoring, wherein the at least one sensor data filtering condition for the requested sensor data includes an indication of the first occluded region as a region where sensor data is desired.

In some aspects, the first occluded region corresponds to a 2D region or 3D region, or the first occluded region is based on one or more angular ranges relative to one or more reference points, or any combination thereof.

In some aspects, the one or more instructions further cause the vehicle apparatus to: detect a second occluded region within the FOV of the vehicle apparatus based on the monitoring, wherein the at least one sensor data filtering condition for the requested sensor data includes an indication of the second occluded region as another region where sensor data is desired.

In some aspects, the one or more instructions further cause the vehicle apparatus to: receive, from at least one of the one or more neighboring communication devices in response to the first message, a second message that includes information that is based on sensor data collected at the at least one neighboring communication device and is filtered based on the at least one sensor data filtering condition.

In some aspects, relative to a vehicle associated with the vehicle apparatus, the at least one neighboring communication device is associated with a neighboring vehicle, a neighboring vulnerable road user (VRU), or a neighboring roadside unit (RSU).

In some aspects, the transmitting transmits the first message via a vehicle-to-vehicle (V2V) protocol or vehicle-to-everything (V2X) protocol.

In some aspects, the first message is an application-layer message.

In an aspect, a non-transitory computer-readable medium storing computer-executable instructions that, when executed by a communication device, cause the communication device to: receive, from a vehicle apparatus that neighbors the communication device, a first message that requests sensor data associated with a field of view (FOV) of the vehicle apparatus and that indicates at least one sensor data filtering condition for the requested sensor data; and determine, in response to the first message, whether sensor data is available at the communication device which satisfies the at least one sensor data filtering condition for the requested sensor data.

In some aspects, the at least one sensor data filtering condition specifies at least one region where sensor data is desired, or the at least one sensor data filtering condition specifies at least one region where sensor data is not desired, or a combination thereof.

In some aspects, the at least one sensor data filtering condition for the requested sensor data includes an indication of a first occluded region as a region where sensor data is desired.

In some aspects, the first occluded region corresponds to a 2D region or 3D region, or the first occluded region is based on one or more angular ranges relative to one or more reference points, or any combination thereof.

In some aspects, the at least one sensor data filtering condition for the requested sensor data further includes an indication of a second occluded region as another region where sensor data is desired.

In some aspects, the determining determines that sensor data is available at the communication device which satisfies the at least one sensor data filtering condition for the requested sensor data, further comprising: filtering, based on the at least one sensor data filtering condition, sensor data obtained at the communication device via a set of sensors communicatively coupled to the communication device; and transmitting, to the vehicle apparatus, a second message including the filtered sensor data.

In some aspects, the transmitting transmits the second message via a vehicle-to-vehicle (V2V) protocol or vehicle-to-everything (V2X) protocol.

In some aspects, the first message is an application-layer message.

In some aspects, relative to a vehicle associated with the vehicle apparatus, the communication device is associated with a neighboring vehicle, a neighboring vulnerable road user (VRU), or a neighboring roadside unit (RSU).

In some aspects, the request for the sensor data and the at least one sensor data filtering condition is included in the first message expressly.

In some aspects, the request for the sensor data and the at least one sensor data filtering condition is included in the first message implicitly.

In some aspects, the first message comprises a location of the vehicle apparatus, further comprising: detect at least one occluded region in the FOV of the vehicle apparatus based on the location of the vehicle apparatus, wherein the detected at least one occluded region is interpreted by the communication device as an implicit request for sensor data in the at least one occluded region.

In some aspects, the first message comprises sensor data that depicts at least part of the FOV of the vehicle apparatus, further comprising: detect at least one occluded region in the FOV of the vehicle apparatus based on the sensor data in the first message, wherein the detected at least one occluded region is interpreted by the communication device as an implicit request for sensor data in the at least one occluded region.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. TA illustrates an exemplary wireless communications system, according to various aspects.

FIGS. 10A-10D illustrate an example whereby the IE data fields or data elements are appended to an existing message, such as an SAE SensorSharing message, so as to convey the parameters $\theta_1$ and $\theta_2$ shown in FIG. 9, in accordance with an embodiment of the disclosure.

DETAILED DESCRIPTION

Aspects of the disclosure relate generally to a method and apparatus related to a vehicle request for sensor data with at least one sensor data filtering condition. In an aspect, a vehicle apparatus monitors, via a set of sensors communicatively coupled to the vehicle apparatus, a field of view (FOV) of the vehicle apparatus. The vehicle apparatus transmits, based on the monitoring, a first message that requests sensor data from one or more neighboring communication devices and indicates at least one sensor data filtering condition for the requested sensor data. In a further aspect, at least one of the neighboring communication devices receives the first message, and determines whether sensor data is available which satisfies the at least one sensor data filtering condition for the requested sensor data. If so, a second message is transmitted back to the vehicle apparatus that includes some or all of the requested sensor data. In a specific example, the at least one sensor data filtering condition may comprise an indication of one or more occluded regions in the FOV of the vehicle apparatus.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1A:
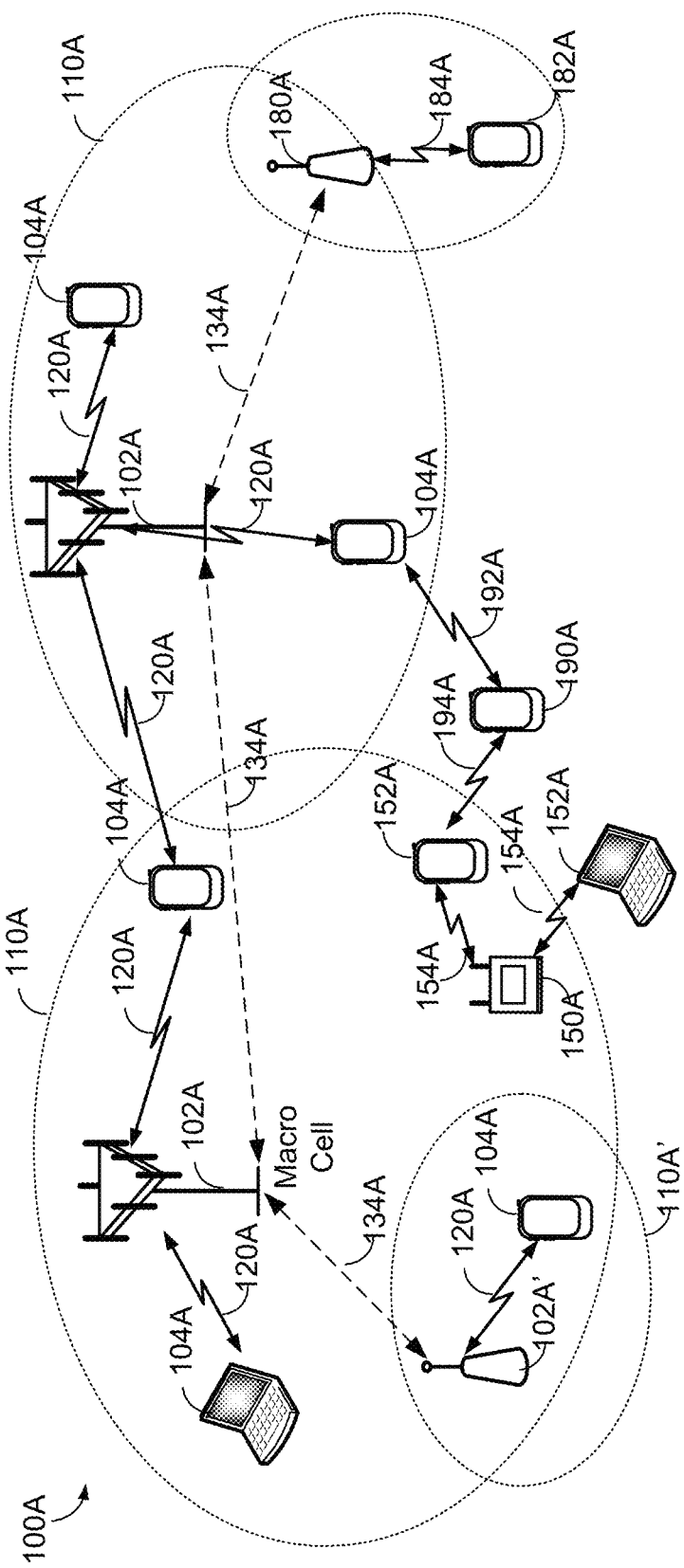
FIG. 1B is a top view of a vehicle employing an integrated radar-camera sensor behind the windshield, according to various aspects of the disclosure.

According to various aspects, FIG. 1A illustrates an exemplary wireless communications system 100A. The wireless communications system 100A (which may also be referred to as a wireless wide area network (WWAN)) may include various base stations 102A and various UEs 104A. The base stations 102A may include macro cells (high power cellular base stations) and/or small cells (low power cellular base stations), wherein the macro cells may include Evolved NodeBs (eNBs), where the wireless communications system 100A corresponds to an LTE network, or gNodeBs (gNBs), where the wireless communications system 100A corresponds to a 5G network or a combination of both, and the small cells may include femtocells, picocells, microcells, etc.

The base stations 102A may collectively form a Radio Access Network (RAN) and interface with an Evolved Packet Core (EPC) or Next Generation Core (NGC) through backhaul links. In addition to other functions, the base stations 102A may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102A may communicate with each other directly or indirectly (e.g., through the EPC/NGC) over backhaul links 134A, which may be wired or wireless.

The base stations 102A may wirelessly communicate with the UEs 104A. Each of the base stations 102A may provide communication coverage for a respective geographic coverage area 110A. In an aspect, although not shown in FIG. 1A, geographic coverage areas 110A may be subdivided into a plurality of cells (e.g., three), or sectors, each cell corresponding to a single antenna or array of antennas of a base station 102A. As used herein, the term "cell" or "sector" may correspond to one of a plurality of cells of a base station 102A, or to the base station 102A itself, depending on the context.

While neighboring macro cell geographic coverage areas 110A may partially overlap (e.g., in a handover region), some of the geographic coverage areas 110A may be substantially overlapped by a larger geographic coverage area 110A. For example, a small cell base station 102A' may have a geographic coverage area 110A' that substantially overlaps with the geographic coverage area 110A of one or more macro cell base stations 102A. A network that includes both small cell and macro cells may be known as a heterogeneous network. A heterogeneous network may also include Home eNBs (HeNBs), which may provide service to a restricted group known as a closed subscriber group (CSG). The communication links 120A between the base stations 102A and the UEs 104A may include uplink (UL) (also referred to as reverse link) transmissions from a UE 104A to a base station 102A and/or downlink (DL) (also referred to as forward link) transmissions from a base station 102A to a UE 104A. The communication links 120A may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100A may further include a wireless local area network (WLAN) access point (AP) 150A in communication with WLAN stations (STAs) 152A via communication links 154A in an unlicensed frequency spectrum (e.g., 5 GHz). When communicating in an unlicensed frequency spectrum, the WLAN STAs 152A and/or the WLAN AP 150A may perform a clear channel assessment (CCA) prior to communicating in order to determine whether the channel is available.

The small cell base station 102A' may operate in a licensed and/or an unlicensed frequency spectrum. When operating in an unlicensed frequency spectrum, the small cell base station 102A' may employ LTE or 5G technology and use the same 5 GHz unlicensed frequency spectrum as used by the WLAN AP 150A. The small cell base station 102A', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100A may further include a mmW base station 180A that may operate in mmW frequencies and/or near mmW frequencies in communication with a UE 182A. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave (mmW). Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180A may utilize beamforming 184A with the UE 182A to compensate for the extremely high path loss and short range. Further, it will be appreciated that in alternative configurations, one or more base stations 102A may also transmit using mmW or near mmW and beamforming. Accordingly, it will be appreciated that the foregoing illustrations are merely examples and should not be construed to limit the various aspects disclosed herein.

The wireless communications system 100A may further include one or more UEs, such as UE 190A, that connects indirectly to one or more communication networks via one or more device-to-device (D2D) peer-to-peer (P2P) links. In the embodiment of FIG. 1A, UE 190A has a D2D P2P link 192A with one of the UEs 104A connected to one of the base stations 102A (e.g., through which UE 190A may indirectly obtain cellular connectivity) and a D2D P2P link 194A with WLAN STA 152A connected to the WLAN AP 150A (through which UE 190A may indirectly obtain WLAN-based Internet connectivity). In an example, the D2D P2P links 192A-194A may be supported with any well-known D2D radio access technology (RAT), such as LTE Direct (LTE-D), WiFi Direct (WiFi-D), BLUETOOTH, and so on.

In some systems, there are six levels that have been defined to achieve full automation. At Level 0, the human driver does all the driving. At Level 1, an Advanced Driver Assistance System (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human occupant need not pay attention in those circumstances. At Level 5, an ADS on the vehicle can do all the driving in all circumstances. The human occupants are just passengers and need never be involved in driving.

These and other safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Figure 1B:
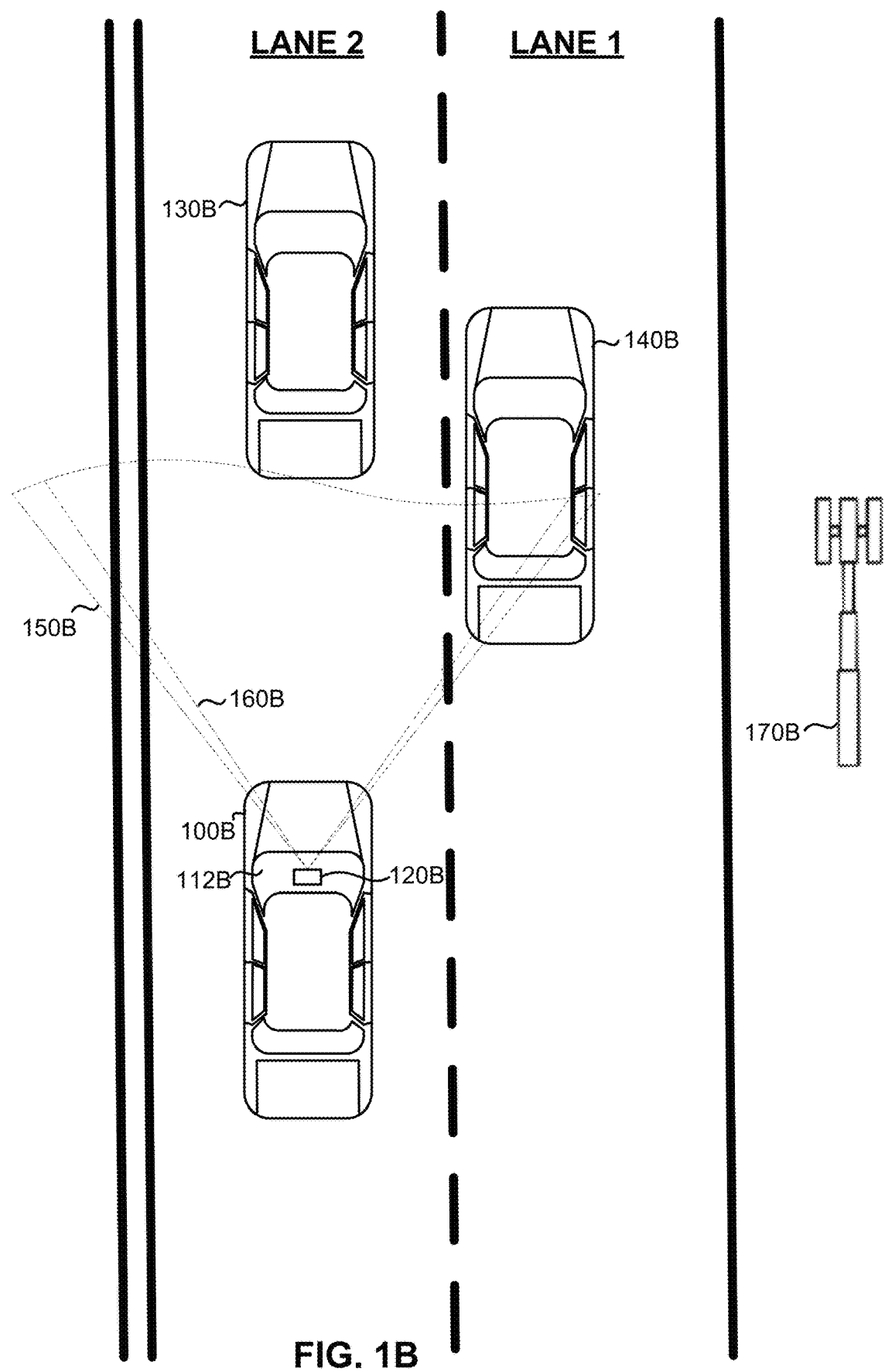

Referring now to FIG. 1B, a vehicle 100B is illustrated that includes a radar-camera sensor module 120B located in an interior compartment of the vehicle 100B behind a windshield 112B. The radar-camera sensor module 120B includes a radar sensor component configured to transmit radar signals through the windshield 112B in a horizontal coverage zone 150B (shown by dashed lines), and receive reflected radar signals that are reflected off of any objects within the coverage zone 150B. The radar-camera sensor module 120B further includes a camera component for capturing images based on light waves that are seen and captured through the windshield 112 in a horizontal coverage zone 160B (shown by dashed lines). The respective coverage zones 150B and 160B form part of the field of view (FOV) of the vehicle 100B. In some cases, each sensor that is communicatively coupled (e.g., mounted on) a respective vehicle may be characterized as having its own FOV, each of which constitutes an example of a FOV for the vehicle 100B. In this case, the vehicle 100B may be characterized as having multiple FOVs (e.g., one for each sensor). Alternatively, sensors may be arranged in groups (e.g., one or more sensor groups), with each sensor group characterized as having its own FOV, each of which constitutes an example of a FOV for the vehicle 100B. Alternatively, the FOVs of individual sensors and/or sensor groups may be aggregated (e.g., so that an occluded region in one sensor's FOV can be patched by another sensor's FOV via the aggregation). Accordingly, as used herein, a FOV of the vehicle 100B may reference either a sensor-specific or sensor group-specific FOV, or alternatively an aggregation of FOVs from various sensors and/or sensor groups.

Although FIG. 1B illustrates an example in which the radar sensor component and the camera component are collocated components in a shared housing, as will be appreciated, they may be separately housed in different locations within the vehicle 100B. For example, the camera part of the radar-camera sensor module 120B may be located as shown in FIG. 1B, and the radar sensor part of the radar-camera sensor module 120B may be located in the grill or front bumper of the vehicle 100B. Additionally, although FIG. 1B illustrates the radar-camera sensor module 120B located behind the windshield 112B, it may instead be located in a rooftop sensor array, or elsewhere. Further, although FIG. 1B illustrates only a single radar-camera sensor module 120B, as will be appreciated, the vehicle 100B may have multiple radar-camera sensor modules 120B pointed in different directions (to the sides, the front, the rear, etc.). The various radar-camera sensor modules 120B may be under the "skin" of the vehicle (e.g., behind the windshield 112B, door panels, bumpers, grills, etc.) or within a rooftop sensor array.

The radar-camera sensor module 120B may detect one or more (or none) objects relative to the vehicle 100B. In the example of FIG. 1B, there are two objects, vehicles 130B and 140B, within the horizontal coverage zones 150B and 160B that the radar-camera sensor module 120B can detect. The radar-camera sensor module 120B may estimate parameters of the detected object(s), such as the position, range, direction, speed, size, classification (e.g., vehicle, pedestrian, road sign, etc.), and the like. The radar-camera sensor module 120B may be employed onboard the vehicle 100B for automotive safety applications, such as adaptive cruise control (ACC), forward collision warning (FCW), collision mitigation or avoidance via autonomous braking, lane departure warning (LDW), and the like. More specifically, the radar-camera sensor module 120 may be part of an onboard unit (OBU) (alternatively referred to as an on-board computer (OBC)), which is described in more detail below with respect to FIG. 2.

In one or more aspects, co-locating the camera and radar sensor permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

In the aspect of FIG. 1B, vehicles 100B, 130B and 140B are traveling in the same direction along a road in proximity to a roadside unit (RSU) 170B, whereby vehicle 140B is in a first lane ("Lane 1") and vehicles 100B and 130B are in a second lane ("Lane 2"). The RSU 170B may correspond to one of a plurality of fixed reference nodes that are deployed along various roadways. RSUs may form part of a Vehicular ad-hoc networks (VANET) and may be configured for direct communication with vehicles via a vehicle-to-vehicle (V2V) communications protocol or vehicle-to-everything (V2X) communications protocol, while further being connected to one or more communication networks (e.g., wireless communications system 100A of FIG. 1A) via a wired or wireless backhaul connection. In an example, the RSU 170B may correspond to a small cell or an access point as described above with respect to the wireless communications system 100A of FIG. 1A. In some aspects, the RSU 170B may be implemented as a vehicle management entity that manages (or coordinates actions) between the neighboring vehicles 100B, 130B and 140B. The RSU 170B may be equipped with various functionalities, including but not limited to short-range communications (e.g., 5.9 GHz Direct Short Range Communications (DSRC), non-DSRC technologies as means of facilitating communication for vehicle-to-vehicle (V2V) and/or vehicle-to-infrastructure (V2I) applications, etc.), location-detection (e.g., GPS, etc.), communicative support functions (e.g., a WiFi hotspot, etc.), navigational support functions (e.g., local map data, Signal Phase and Timing (SPaT) information for intersection-based applications and localized roadway warnings, etc.), and so on.

Referring to FIG. 1B, in one aspect, the vehicles 130B and 140B may be similarly provisioned with respective radar-camera sensor modules 120B, and may be capable of direct vehicle-to-vehicle (V2V) communication via respective communication interfaces. However, it is also possible for only one or even none of vehicles 130B and 140B to be equipped with such 'smart' vehicle technology.

Figure 2:
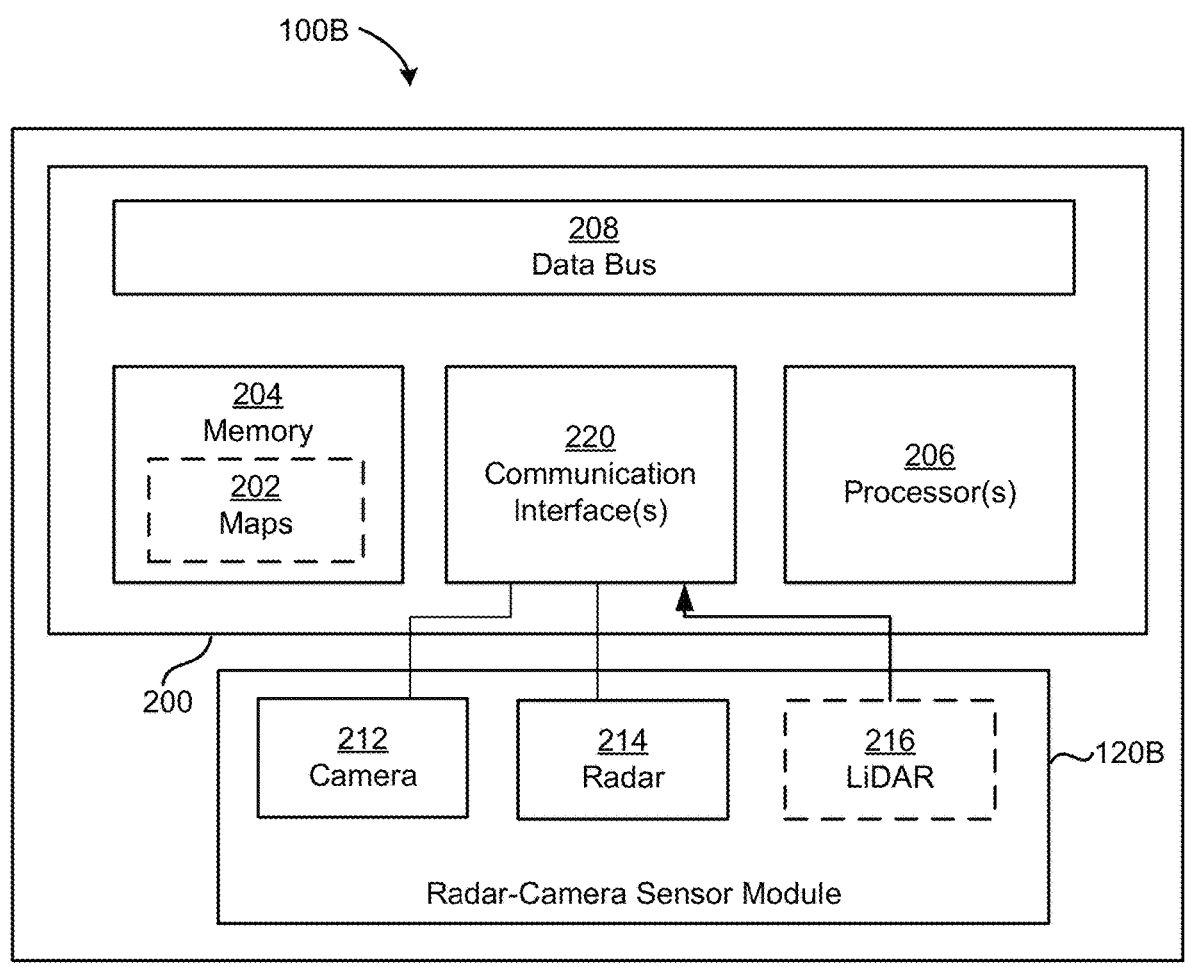
FIG. 2 illustrates an on-board unit (OBU) computer architecture, according to various aspects of the disclosure.

FIG. 2 illustrates an on-board unit (OBU) 200 of the vehicle 100B of FIG. 1B, according to various aspects. In an aspect, the OBU 200 may be referred to herein as a vehicle apparatus, and may be part of an ADAS or ADS. The OBU 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBU 200 described herein.

One or more radar-camera sensor modules 120B are coupled to the OBU 200 (only one is shown in FIG. 2 for simplicity). In some aspects, the radar-camera sensor module 120B includes at least one camera 212 (e.g., a forward-facing camera as shown via the coverage zone 160B in FIG. 1B), at least one radar sensor 214, and an optional Light Detection and Ranging (LIDAR) sensor 216. While not shown expressly, the radar-camera sensor module 120B may further optionally include a Sound Navigation and Ranging (SONAR) detector, a Radio Detection and Ranging (RADAR) detector, and/or an infrared detector. The OBU 200 also includes one or more communication interfaces 220 connecting the processor(s) 206, by way of the data bus 208, to the radar-camera sensor module 120B, other vehicle sub-systems (not shown), and in some cases, wireless communication networks (not shown), such as wireless local area networks (WLANs), global positioning systems (GPS) networks, cellular telecommunication networks, and the like. In an example, the one or more communication interfaces 220 may include a network interface (e.g., a wireless LTE, 5G NR, a wired backhaul connection to a core network component, etc.) to connect to one or more network access points or base stations (e.g., cellular base stations, RSUs, etc.), and a second interface (e.g., V2X, 5.9 GHz DSRC, etc.) to connect directly to nearby (or neighboring) vehicles. In an example, V2X connections may be implemented via unicast, multicast or broadcast protocols. The various V2X connections described below may be implemented in accordance with any one of these protocols.

In an aspect, the OBU 200 may utilize the communication interfaces 220 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100B. Map(s) 202 may also provide electronic horizon predictive awareness, which enables the vehicle 100 to know what lies ahead.

In an aspect, the camera 212 may capture image frames of the scene within the viewing area of the camera 212 (as illustrated in FIG. 1B as horizontal coverage zone 160B) at some periodic rate. Likewise, the radar sensor 214 may capture radar frames of the scene within the viewing area of the radar sensor 214 (as illustrated in FIG. 1B as horizontal coverage zone 150B) at some periodic rate. The periodic rates at which the camera 212 and the radar sensor 214 capture their respective frames may be the same or different. In an aspect, each camera and radar frame may be time-stamped. Thus, where the periodic rates are different, the timestamps can be used to select simultaneously, or nearly simultaneously, captured camera and radar frames for further processing (e.g., fusion).

Figure 3:
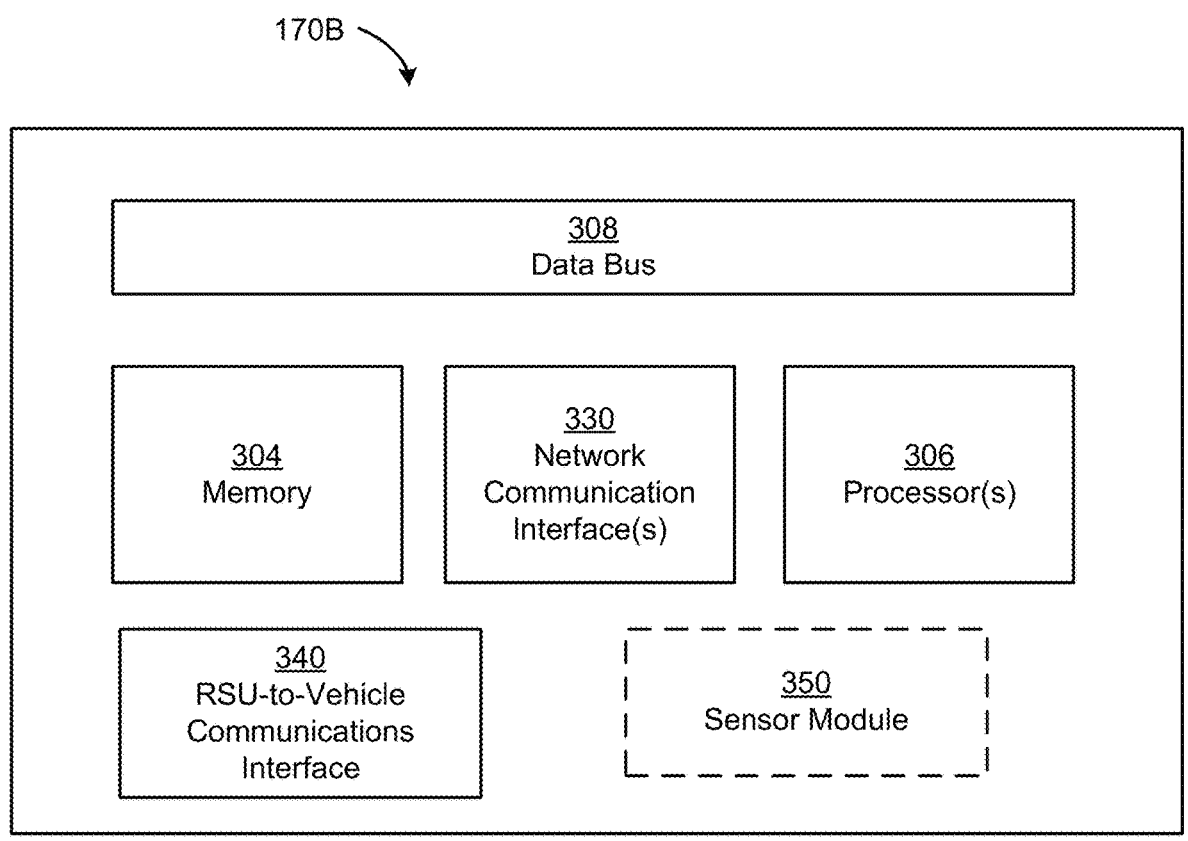
FIG. 3 illustrates components of a Road Side Unit (RSU) according to various aspects.

FIG. 3 illustrates components of the RSU 170B of FIG. 1B according to various aspects. In an aspect, the RSU 170B is configured with a memory 304, and one or more processors 306 in communication with the memory 304 via a data bus 308. The RSU 170B further includes one or more network communication interfaces 330, which may be used to communicatively couple the RSU 170B to a communications network (e.g., a macro base station, another RSU, a core network component, etc.) via a wired or wireless backhaul connection. The RSU 170B is further configured with a RSU-to-vehicle communications interface 340 (e.g., V2X, 5.9 GHz DSRC, etc.) for direct RSU-to-vehicle communication. The RSU 170B is also optionally configured with a sensor module 350, which may be configured with any combination of camera(s), radar, LIDAR, GPS, etc. As will be described below in more detail, in certain aspects the sensor module 350 may be used to scan the locations of a set of neighboring vehicles to obtain sensor data that replaces and/or supplements sensor data measured or derived by one or more of the neighboring vehicles.

Many vehicles manufactured today are equipped with numerous sensors, including cameras, radar, Light Detection and Ranging (LIDAR) and ultrasound. These sensors are used to detect environment about the car, including other vehicles, obstacles and vulnerable road users (VRUs), such as pedestrians, cyclists, etc. To address instances where vehicle sensors are subject to occlusion, or objects are beyond the range of a vehicle's sensors, standards bodies, including SAE, ETSI-ETS and CSAE, are defining application-layer standards for vehicle-to-everything (V2X) sensor-sharing, or the dissemination of detected vehicles and/or objects. These standards are applicable to any V2X entity, including vehicles, infrastructure Road Side Units (RSUs) and V2X-equipped mobile devices.

Figure 4:
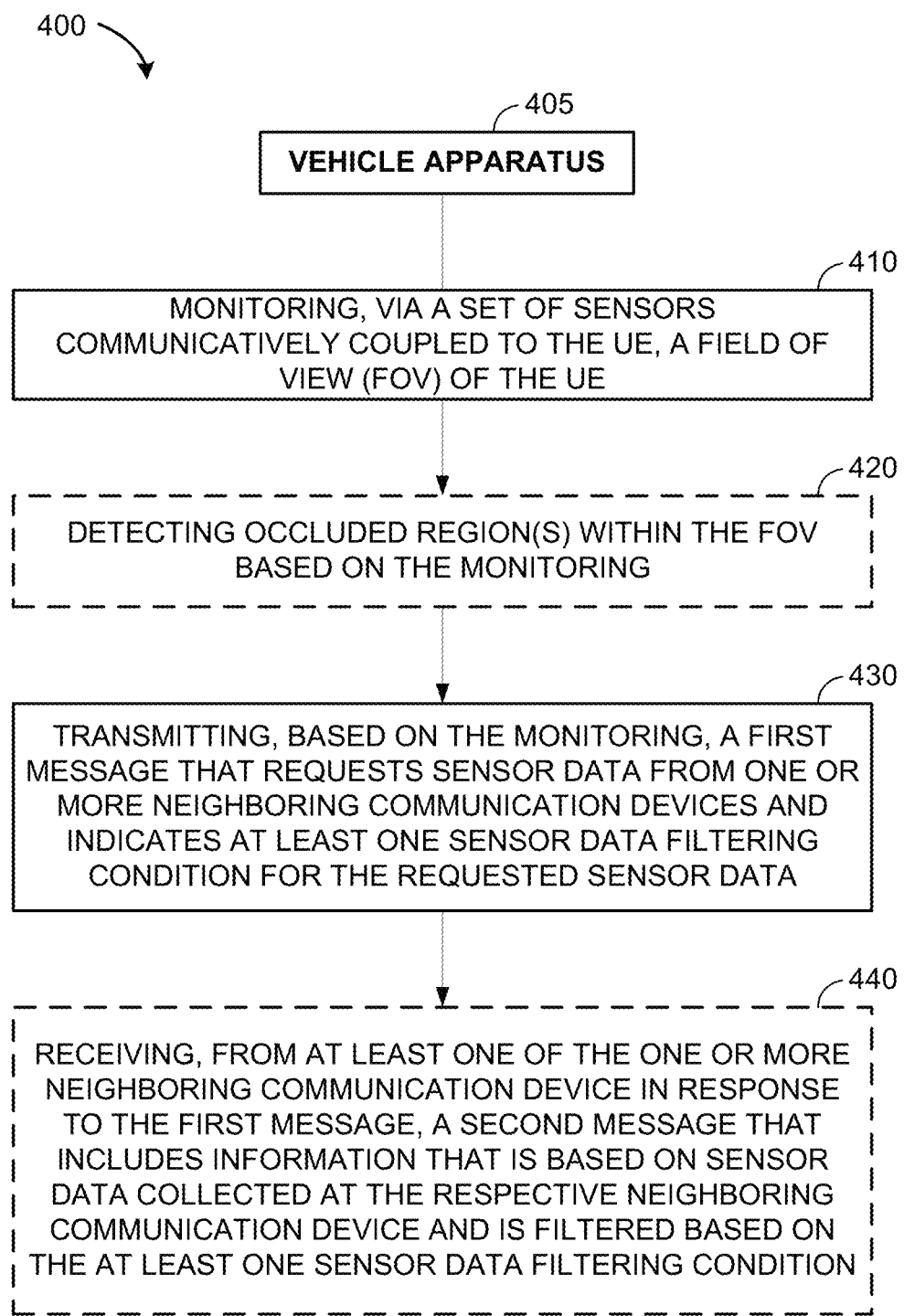
FIG. 4 is a flow diagram illustrating an example method of communication in accordance with an aspect of the present disclosure.

FIG. 4 is a flow diagram illustrating an example method 400 of communication in accordance with an aspect of the present disclosure. The method 400 may be performed, for example, by a vehicle apparatus 405 (or more specifically, by a computer or OBU on-board a vehicle), which may be associated with a vehicle such as the vehicle 100B described above with respect to FIGS. 1B-2.

Referring to FIG. 4, at block 410, the vehicle apparatus 405 (e.g., OBU 200 of FIG. 2) monitors via a set of sensors (e.g., radio-camera sensor module 120B of FIGS. 1B-2) communicatively coupled to the vehicle apparatus, a field of view (FOV) of the vehicle apparatus.

At block 420, the vehicle apparatus 405 (e.g., OBU 200 of FIG. 2) optionally detects a first occluded region within the FOV based on the monitoring. In this case, the at least one sensor data filtering condition for the requested sensor data may include an indication of the first occluded region as a region where sensor data is desired. In a further aspect, one or more additional occluded regions within the FOV of the vehicle apparatus may further be detected based on the monitoring, in which case the at least one sensor data filtering condition for the requested sensor data further includes an indication of these additional occluded regions as other regions where sensor data is desired. In an example, one or more of the occluded regions may be defined as a 2D region (or planar region) or a 3D region, one or more of the occluded regions may be based on one or more angular ranges relative to one or more reference points (e.g., a representative location of the associated vehicle, a sensor-specific location, etc.), or any combination thereof. In an example, the first message may correspond to a unicast, multicast or broadcast message with an application-layer part that includes the indicates at least one sensor data filtering condition.

At block 430, the vehicle apparatus 405 (e.g., one or more of communication interfaces 220) transmits, based on the monitoring, a first message that requests sensor data from one or more neighboring communication devices and indicates at least one sensor data filtering condition for the requested sensor data. In an example, the at least one sensor data filtering condition specifies at least one region where sensor data is desired, at least one region where sensor data is not desired, or a combination thereof. In an example, the first message may be transmitted via a vehicle-to-vehicle (V2V) protocol or vehicle-to-everything (V2X) protocol. In an example, the first message may correspond to an application-layer (or L3) message. In some designs, the sensor data request may correspond to a one-time request data. In other designs, the sensor data request may correspond to a request for sensor data for some period of time (e.g., sharing a video camera feed for some amount of time, e.g., until the neighboring communication device(s) are no longer in range, or until some expiration time is reached, etc.).

At block 440, the vehicle apparatus 405 (e.g., one or more of communication interfaces 220) receives, from at least one of the one or more neighboring communication devices in response to the first message, a second message that includes information that is based on sensor data collected at the respective neighboring communication device and is filtered based on the at least one sensor data filtering condition. In some designs, relative to a vehicle associated with the vehicle apparatus 405, the at least one neighboring communication device may be associated with a neighboring vehicle, a neighboring vulnerable road user (VRU), or a neighboring roadside unit (RSU). In an example, the second message may correspond to a unicast message with an application-layer part that includes the filtered sensor data.

Figure 5:
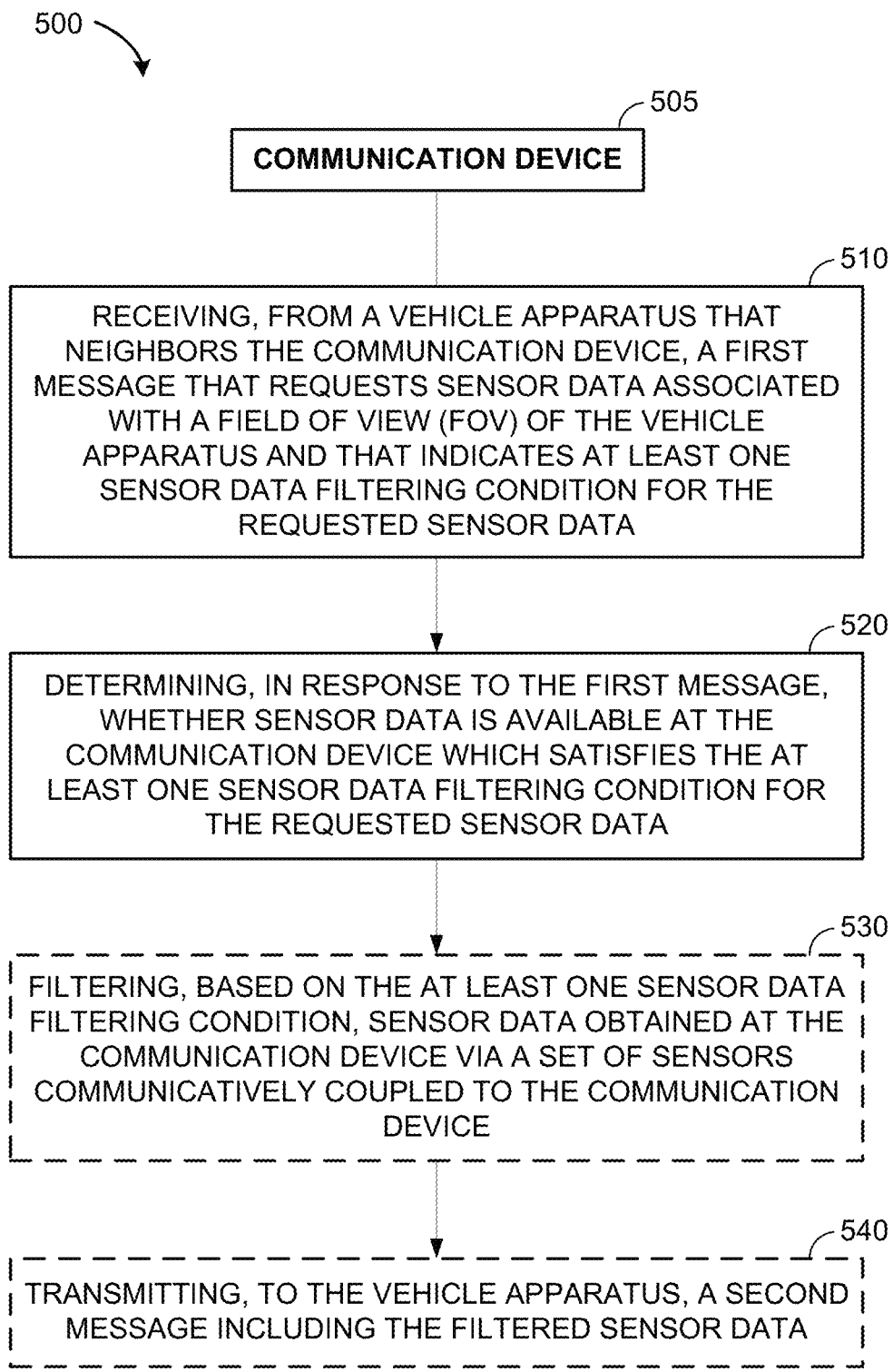
FIG. 5 is a flow diagram illustrating an example method of communication in accordance with another aspect of the present disclosure.

FIG. 5 is a flow diagram illustrating an example method 500 of communication in accordance with another aspect of the present disclosure. The method 500 may be performed, for example, by a communication device 505, which may be associated with a vehicle such as the vehicle 100B described above with respect to FIGS. 1B-2, an infrastructure device such as RSU 170B, a VRU (e.g., a UE operated by a bicyclist or a pedestrian), a V2X-equipped mobile device, etc.

At block 510, the communication device 505 (e.g., one or more of communication interfaces 220, the RSU-to-vehicle communications interface 340, a communications interface associated with a UE operated by a VRU, etc.) receives, from a vehicle apparatus that neighbors the communication device, a first message that requests sensor data associated with a FOV of the vehicle apparatus and that indicates at least one sensor data filtering condition for the requested sensor data. In an example, the first message received at 510 may correspond to the first message transmitted at 430 of FIG. 4. In an example, the first message may correspond to a unicast, multicast or broadcast message with an application-layer part that includes the indicates at least one sensor data filtering condition. In some designs, the sensor data request may correspond to a one-time request data. In other designs, the sensor data request may correspond to a request for sensor data for some period of time (e.g., sharing a video camera feed for some amount of time, e.g., until the neighboring communication device(s) are no longer in range, or until some expiration time is reached, etc.).

At block 520, the communication device 505 (e.g., processor(s) 206, processor(s) 306, processor(s) of a UE operated by a VRU, etc.) determines, in response to the first message, whether sensor data is available at the communication device which satisfies the at least one sensor data filtering condition for the requested sensor data. For example, if the at least one sensor data filtering condition specifies at least one region where sensor data is desired, then the communication device 505 can determine whether sensor data inside the at least one region is available at 520. In another example, if the at least one sensor data filtering condition specifies at least one region where sensor data is not desired, then the communication device 505 can determine whether sensor data outside of the at least one region is available at 520.

At block 530, the communication device 505 (e.g., processor(s) 206, processor(s) 306, processor(s) of a UE operated by a VRU, etc.) optionally filters, based on the at least one sensor data filtering condition, sensor data obtained at the communication device via a set of sensors communicatively coupled to the communication. For example, if the at least one sensor data filtering condition specifies at least one region where sensor data is desired, then the communication device 505 can filter out sensor data that is outside of the at least one region at 530. In another example, if the at least one sensor data filtering condition specifies at least one region where sensor data is not desired, then the communication device 505 can filter out sensor data that is inside of the at least one region at 530.

At block 540, the communication device 505 (e.g., one or more of communication interfaces 220, the RSU-to-vehicle communications interface 340, a communications interface associated with a UE operated by a VRU, etc.) optionally transmits, to the vehicle apparatus, a second message including the filtered sensor data from optional block 530. In an example, the second message may correspond to a unicast message with an application-layer part that includes the filtered sensor data.

Referring to FIGS. 4-5, in an aspect, the at least one sensor data filtering condition may include one or more 'occluded' regions. For example, in the presence of other vehicles, buildings or environmental features, the sensors mounted on a vehicle, RSU or other V2X entity may be occluded in a portion of the FOV. In an aspect, obtaining sensor data from another vehicle, VRU and/or an RSU allows the V2X entity subject to occlusion to fill in the gaps (at least partially) in the perception of its surroundings. For example, in some conventional designs, V2X entities from which sensor data is requested may share all sensor data (or identification of all objects) within their respective FOV. However, at least some part of this sensor data may be irrelevant to the requesting entity (e.g., outside of an occluded region, or outside of a relevant FOV region). As such, this information will not aid the vehicle experiencing occlusion, and will instead contribute to over-the-air congestion as well as processing overhead. Similarly, if the FOV is a superset of the obstructed region of the vehicle experiencing occlusion, it may include information already detected by the vehicle experiencing occlusion. Hence, in some designs, specifying at least one sensor data filtering condition (e.g., occluded region identification) may provide various technical advantages, such as reducing OTA congestion, reducing processing overhead and/or memory requirements, etc.

Referring to FIG. 5, in an example, the at least one sensor data filtering condition may be indicated implicitly in some cases. For example, the first message at 510 may specify a location of the vehicle apparatus. The communication device 505 may then infer the at least one sensor data filtering condition from the specified vehicle location. In a specific example, assume that the first message indicates that the vehicle apparatus is positioned directly behind a vehicle to which the communication device 505 is coupled. In this case, the relative location of the vehicle apparatus implies that a region in front of this vehicle would be occluded in the FOV of the vehicle apparatus (e.g., because this vehicle itself constitutes a physical obstruction to the FOV of the vehicle apparatus). Instead of waiting for an explicit request for this sensor data, the communication device 505 can instead act in a more preemptive manner by interpreting the vehicle location data as an implicit indication of a sensor data filtering condition (e.g., implicitly requesting data in front of the vehicle to which the communication device 505 is coupled).

In another alternative example, the first message may comprise at least part of the FOV of the vehicle apparatus itself. For example, the first message may comprise a image (e.g., a video frame or static image) that is captured from a camera of the vehicle apparatus. The communication device 505 can then scan the image to detect at least one occluded region. The communication device 505 may then infer the at least one sensor data filtering condition from the detected occluded region(s). Instead of waiting for an explicit request for this sensor data, the communication device 505 can instead act in a more preemptive manner by interpreting the 'raw' sensor data (e.g., image) as an implicit indication of a sensor data filtering condition (e.g., implicitly requesting data that is occluded from the FOV of the shared camera feed). In some designs, vehicles with communication devices that are capable of sharing sensor data in this manner may further be capable of advertising their sensor data sharing capability. In this case, the first message may be transmitted responsive to receipt of a sensor sharing capability message.

Figure 6:
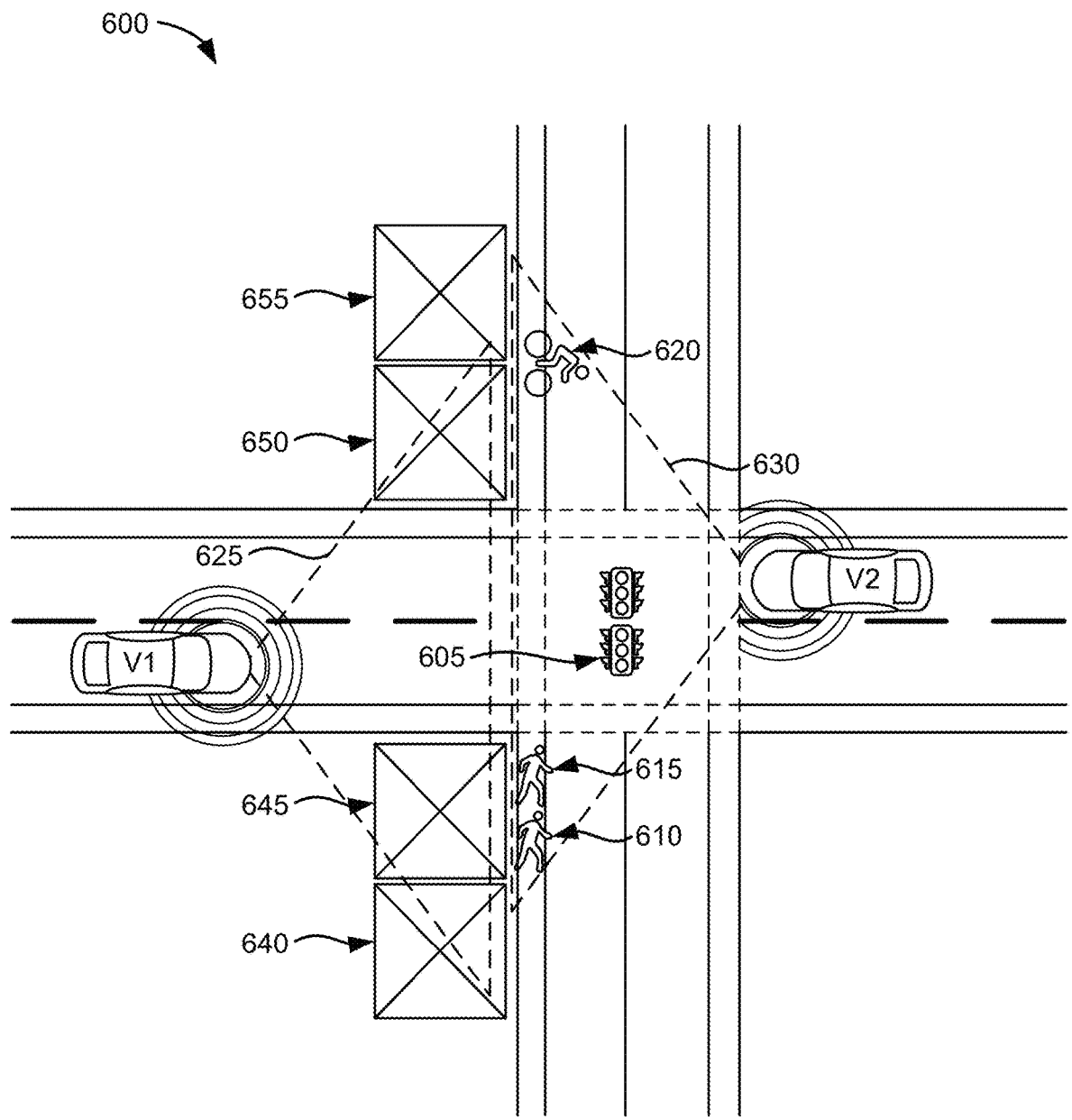
FIG. 6 illustrates a scenario in which the processes of FIGS. 4-5 may be implemented in accordance with an embodiment of the disclosure.

FIG. 6 illustrates a scenario 600 in which the processes of FIGS. 4-5 may be implemented in accordance with an embodiment of the disclosure. In scenario 600, a vehicle (V1) is approaching an intersection with a traffic light 605. Another vehicle (V2) is stopped at the traffic light 605. Also proximate to the intersection are VRUs 610-620, whereby VRUs 610-615 are pedestrians and VRU 620 is a bicyclist. V1 has a FOV depicted as 625, and V2 has a FOV depicted as 630. Further depicted in scenario 600 are obstructions 640-655 (e.g., buildings, signs, etc.) that occlude part of the FOV 625 of V1. In an example, V1 and V2 may be configured as 'smart' vehicles, similar to vehicle 100B as described above.

Figure 7:
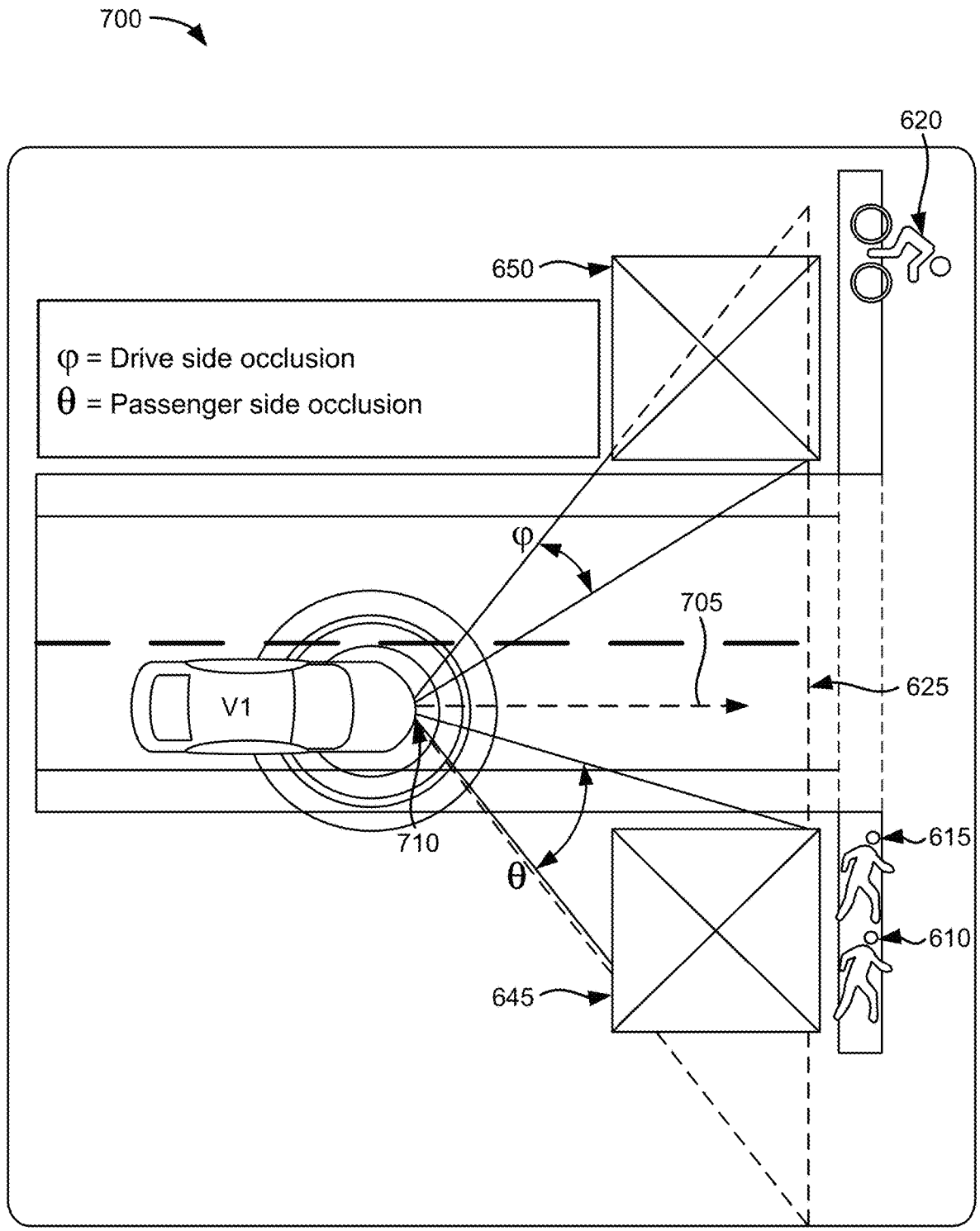
FIG. 7 illustrates a zoomed-in perspective of the scenario of FIG. 6 in accordance with an embodiment of the disclosure.

FIG. 7 illustrates a zoomed-in perspective 700 of the scenario 600 in accordance with an embodiment of the disclosure. In FIG. 7, occluded regions are defined based on respective angular ranges denoted as $\varphi$ and $\theta$ relative to an axis 705 that is aligned with a reference point 710. In an example, the reference point 710 may correspond to a sensor location of a sensor (or group of sensors) that is scanning the FOV 625. For example, different sensor groups (or individual sensors) may be associated with their own sensor-specific or sensor group-specific FOVs. In another example, the reference point 710 may correspond to a default or representative reference point for V1 that is independent of sensor location or is based on multiple sensor locations (e.g., an averaged or weighted-averaged location of the distributed sensors of V1 is used as the reference point 710). As shown in FIG. 7, occluded regions $\varphi$ and $\theta$ are defined by the obstructions 645-650, which block part of the FOV 625. In this case, the result is that VRUs 610-620 are not detected within the FOV 625 due to the occluded regions $\varphi$ and $\theta$.

However, while not visible to V1, VRUs 610-620 are part of the FOV 630 of V2. Hence, via execution of the processes of FIGS. 4-5, V1 can transmit a request for sensor data (e.g., via V2X, V2V, etc.) that identifies the occluded regions $\varphi$ and $\theta$, and V2 can receive the sensor data request, determine that V2 has some sensor data that maps to the occluded regions $\varphi$ and $\theta$, and can respond with the requested sensor data (e.g., via V2X, V2V, etc.). In some designs, the response from V2 can indicate the raw sensor data for the occluded regions $\varphi$ and $\theta$. In other designs, V2 can indicate object-specific information, such as the locations of VRUs 610-620.

Figure 8:
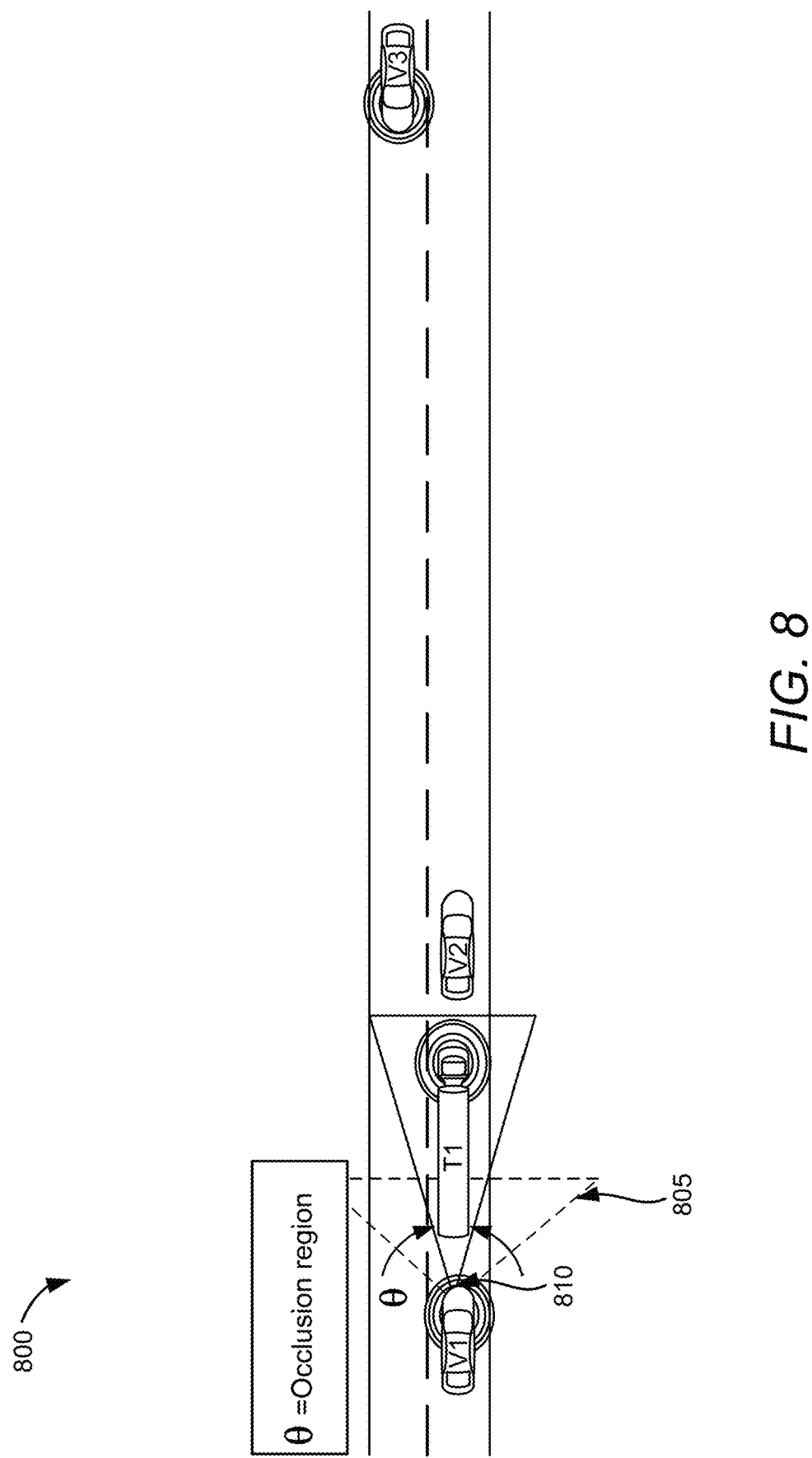
FIG. 8 illustrates another scenario in which the processes of FIGS. 4-5 may be implemented in accordance with another embodiment of the disclosure.

FIG. 8 illustrates another scenario 800 in which the processes of FIGS. 4-5 may be implemented in accordance with another embodiment of the disclosure. In scenario 600, a vehicle (V1) is driving behind a truck (T1) that is in turn driving behind a vehicle (V2). A vehicle (V3) is driving in the opposite direction towards V1, T1 and V2. V1 has a FOV depicted as 805. In an example, V1 and V2 may be configured as 'smart' vehicles, similar to vehicle 100B as described above. However, V3 is a legacy vehicle that does not have 'smart' interactive capability (e.g., V2X).

In the scenario 800, T1 is positioned as an obstruction to V2's FOV 805, which results in an occluded region denoted as $\theta$ relative to a respective axis (not shown expressly in FIG. 8) that is aligned with a reference point 810. In an example, the reference point 810 may correspond to a sensor location of a sensor (or group of sensors) that is scanning the FOV 805. For example, different sensor groups (or individual sensors) may be associated with their own sensor-specific or sensor group-specific FOVs. In another example, the reference point 810 may correspond to a default or representative reference point for V1 that is independent of sensor location or is based on multiple sensor locations (e.g., an averaged or weighted-averaged location of the distributed sensors of V1 is used as the reference point 810). In this case, the result is that V2 is not detected within V1's FOV 805 due to the occluded region $\theta$.

However, while not visible to V1, V2 is not obstructed with respect to V3's FOV (not expressly shown in FIG. 8). Hence, via execution of the processes of FIGS. 4-5, V1 can transmit a request for sensor data (e.g., via V2X, V2V, etc.) that identifies the occluded region $\theta$, and V3 can receive the sensor data request, determine that V3 has some sensor data that maps to the occluded region $\theta$, and can respond with the requested sensor data (e.g., via V2X, V2V, etc.). In some designs, the response from V3 can indicate the raw sensor data for the occluded region $\theta$. In other designs, V3 can indicate object-specific information, such as the locations of V2.

Referring to FIG. 8, as an alternative, V1 may indicate its location instead of an explicit occlusion region identification (e.g., $\theta$) in some designs. In this case, V3 may receive V1's location message and then use its own knowledge of the relative locations of T1 and V2 to intuit that V1 most likely has no knowledge of V2's presence. Hence, the location message from V1 may be interpreted as an implicit request for sensor data for an implicitly indicated occluded region for V1 (in this case, a region that comprises V2).

Figure 9:
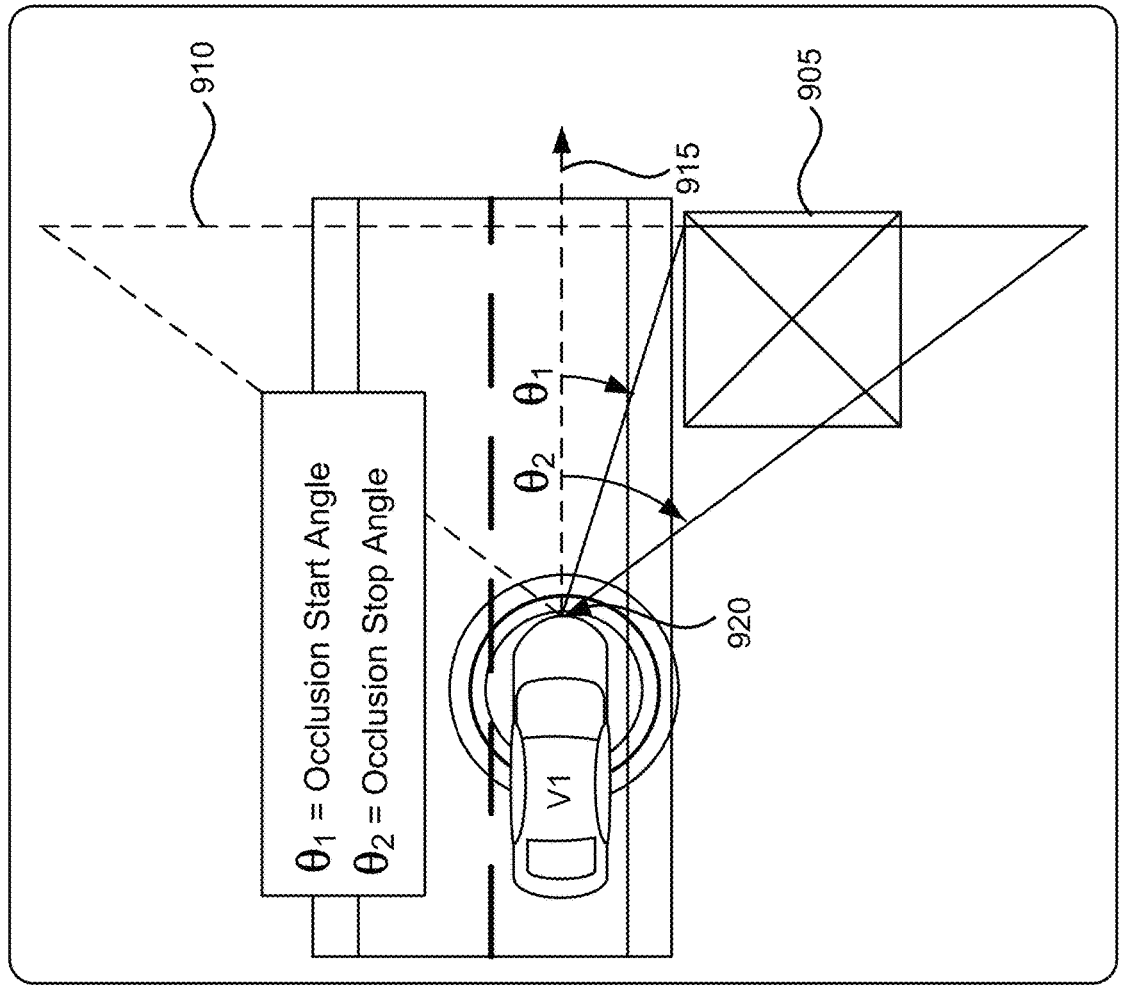
FIG. 9 illustrates another scenario in which the processes of FIGS. 4-5 may be implemented in accordance with another embodiment of the disclosure.

FIG. 9 illustrates another scenario 900 in which the processes of FIGS. 4-5 may be implemented in accordance with another embodiment of the disclosure. In scenario 900, a vehicle (V1) is driving proximate to a physical objection 905 that occludes part of V1's FOV 910. In FIG. 9, an occluded region which may be denoted as $(\theta_1, \theta_2)$ is defined based on respective angular start and stop points, denoted as $\theta_1$ and $\theta_2$ relative to an axis 915 that is aligned with a reference point 920. Similar to FIGS. 6-8, the reference point 920 may be a representative location for V1, or may be sensor-specific or sensor-group specific.

Referring to FIG. 9, in some designs, the occluded region $(\theta_1, \theta_2)$ may be indicated in an OTA application-layer message that may be defined by a C-V2X standard (e.g., SAE, ETSI-ITS, C-SAE/C-ITS, etc.), whereby the parameters $\theta_1$ and $\theta_2$ are specified via Information Element (IE) data fields or data elements in a new, dedicated Occlusion- Assistance message or appended to an existing message, such as an SAE SensorSharing message.

One example of a dedicated application-layer OcclusionAssistance message is shown below in Table 1:

TABLE 1

Example of OcclusionAssistance Message Format

| Message Part | Element Name | DF, DE | Description |
|---|---|---|---|
| HostData | msgCnt | DE_MsgCount | Sequence number |
| | id | DE_Temporary ID | 4 octet random device identifier |
| | secMark | DE_Dsecond | |
| | lat | DE_Latitude | Vehicle Latitude, 0.1 m° |
| | long | DE_Longitude | Vehicle Longitude, 0.1m° |
| | elev | DE_Elevation | Vehicle elevation, 10 cm step |
| | hostType | DE_HostType | OBU, RSU, VRU, other |
| | MsgType | DE_MsgType | Boolean (0: Request; 1: Command) |
| Occlusion-Region | OcclusionCount | DE_OcclusionCount | Number of 2D occlusion regions included (1 . . . 15) |
| | OcclusionAngle | DF_OcclusionAngle | Start, stop angle of occluded region |
| | OcclusionAngle | DF_OcclusionAngle | Start, stop angle of occluded region | whereby

TABLE 2

| PLE DE | DE, DF | Description |
|---|---|---|
| DE_OcclusionCount | INTEGER (1 . . . 15) | Number of 2D occlusion regions |
| DF_OcclusionAngle | DE_OcclusAngleStart | θ1: DE_Heading (angle in units of 0.0125° from WGS84 North, where East is positive) |
| | DE_OcclusAngleStop | θ2: DE_Heading (angle in units of 0.0125° from WGS84 North, where East is positive) |

In Table 1, the OcclusionAssistance message is specific to 2D occlusion regions, although other embodiments may encompass 3D occlusion regions as well. The Occlusion-Region Message Part includes new fields that are added to a standard HostData section. In an example, fields in the HostData Message Part may be used to derive the reference point 920. In this case, each OcclusionAngle Element for each respective 2D occlusion region may specify the parameters $\theta_1$ and $\theta_2$ for a particular occlusion region. In Table 2, the parameters $\theta_1$ and $\theta_2$ are defined more specifically, relative to WGS84 North, which in this case corresponds to the axis 915.

FIGS. 10A-10D illustrates an example whereby the IE data fields or data elements are appended to an existing message, such as an SAE SensorSharing message, so as to convey the parameters $\theta_1$ and $\theta_2$ shown in FIG. 9, in accordance with an embodiment of the disclosure. In the example of FIG. 10, a new Element objCount indicates a detected object count (DE DetectedObjectCount) and a new Element detObj indicates a sequence or listing of the detected objects (DF DetectedObject). For example, these fields may be used by V1 in FIG. 9 to report its own known or detected objects (e.g., VRUs, other vehicles, obstructions, etc.), so that neighboring devices can identify objects (e.g., VRUs, other vehicles, obstructions, etc.) that have not been identified by V1 due to the occlusion region ($\theta_1$, $\theta_2$).

Referring to FIGS. 10A-10D, the SAE SensorSharing message further includes a new OcclusionRegionExtension data frame that indicates a number of occlusion regions (OcclusCount/DE OcclusionCount) and an angular definition of each occlusion region (OcclusAngle/DF OcclusionAngle). Similar to Table 2, the parameters $\theta_1$ and $\theta_2$ for each occlusion region may be indicated via these respective Element or Content fields.

While Tables 1-2 and FIGS. 10A-10D are described specifically with respect to the scenario 900 of FIG. 9, it will be appreciated that these aspects can readily be modified to accommodate various modifications, such as the scenario 800 where a single angular reference θ is used to denote an occlusion region, the scenario 700 where multiple occlusion regions are identified, 3D occlusion regions, etc.

Figure 11:
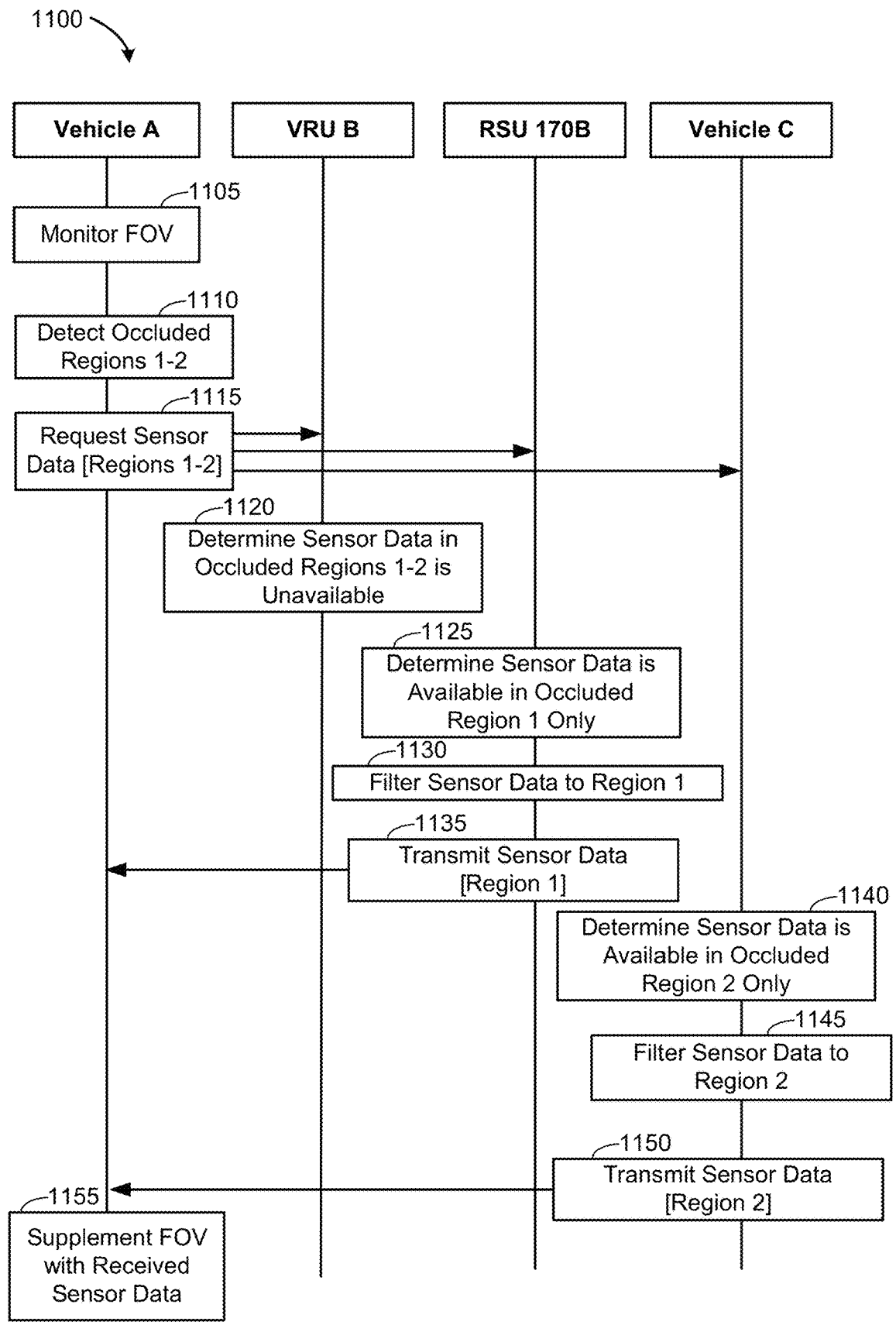
FIG. 11 illustrates an example implementation of the processes of FIGS. 4-5 in accordance with an embodiment of the disclosure.

FIG. 11 illustrates an example implementation 1100 of the processes of FIGS. 4-5 in accordance with an embodiment of the disclosure. In particular, FIG. 11 relates to a scenario where Vehicle A is proximate to VRU B, RSU 170B and Vehicle C. In FIG. 11, Vehicle A performs the process 400 of FIG. 4, and VRU B, RSU 170B and Vehicle C each perform the process 500 of FIG. 5.

At block 1105 (e.g., as in 410 of FIG. 4), Vehicle A monitors its FOV via one or more sensors. At block 1110 (e.g., as in 420 of FIG. 4), Vehicle A detects two occluded regions 1 and 2. At block 1115 (e.g., as in 430 of FIG. 4 and 510 of FIG. 5), Vehicle A transmits a sensor data request, which is received at VRU B, RSU 170B and Vehicle C.

At block 1120 (e.g., as in 520 of FIG. 5), VRU B determines that sensor data in occluded regions 1 and 2 is unavailable. In this example, VRU B does not respond to the sensor data request from 1115 based on the determination from 1120. However, in other designs, VRU B may acknowledge the sensor data request from 1115 to expressly indicate its lack of relevant sensor data.

At block 1125 (e.g., as in 520 of FIG. 5), RSU 170B determines that sensor data in occluded region 1 is available while sensor data in occluded region 2 is unavailable. At block 1130 (e.g., as in 530 of FIG. 5), RSU 170B filters its total available sensor data to occluded region 1 (e.g., to avoid delivering irrelevant sensor data to Vehicle A). At block 1135 (e.g., as in 440 of FIG. 4 and 540 of FIG. 5), RSU 170B transmits the filtered sensor data to Vehicle A, and Vehicle A receives the filtered sensor data.

At block 1140 (e.g., as in 520 of FIG. 5), Vehicle C determines that sensor data in occluded region 2 is available while sensor data in occluded region 1 is unavailable. At block 1145 (e.g., as in 530 of FIG. 5), Vehicle C filters its total available sensor data to occluded region 2 (e.g., to avoid delivering irrelevant sensor data to Vehicle A). At block 1150 (e.g., as in 440 of FIG. 4 and 540 of FIG. 5), Vehicle C transmits the filtered sensor data to Vehicle A, and Vehicle A receives the filtered sensor data. At block 1155, Vehicle A supplements its FOV based on the received, filtered sensor data.

Referring to FIGS. 4-5, in a first implementation example, the communication device (e.g., OBU of $V_{Ego}$) may obtain the sensor data so as to detect a non-V2X vehicle. For example, the communication device may correspond to a V2X-capable vehicle, $V_{Ego}$, which detects a non-V2X vehicle $V_{NV}$ using its on-board sensors. To this end, $V_{Ego}$ transmits a sensor-sharing message including the detected characteristics of the detected vehicle ($V_{NV}$). Recipient(s) of the sensor-sharing message (e.g., RSU, another V2X-capable vehicle denoted as $V_{remote}$) may use information to determine maneuvers and/or coordination with other vehicle(s).

Referring to FIGS. 4-5, in a second implementation example, the communication device (e.g., OBU of $V_{Ego}$) may detect an obstacle in the road using its on-board sensors. $V_{Ego}$ transmits a sensor-sharing message including the detected characteristics of the object. Recipient(s) of the sensor-sharing message (e.g., RSU, $V_{remote}$) may use information to determine maneuvers and/or coordination with other vehicle(s).

Referring to FIGS. 4-5, in a third implementation example, the communication device (e.g., OBU of $V_{Ego}$) detects a VRU proximate to the road using its on-board sensors. $V_{Ego}$ transmits a sensor-sharing message including the detected characteristics of the VRU. Recipient(s) of the sensor-sharing message (e.g., RSU, $V_{remote}$) may use information to determine maneuvers and/or coordination with other vehicle(s).

Referring to FIGS. 4-5, in a fourth implementation example, the communication device (e.g., V2X-capable RSU) detects a non-V2X vehicle ($V_{NV}$) using its sensors. RSU transmits a sensor-sharing message including the detected characteristics of the detected vehicle ($V_{NV}$). Recipient(s) of the sensor-sharing message ($V_{remote}$) may use information to determine maneuvers and/or coordination with other vehicle(s).

Referring to FIGS. 4-5, in a fifth implementation example, the communication device (e.g., V2X-capable RSU) detects an obstacle in the road using its on-board sensors. RSU transmits a sensor-sharing message including the detected characteristics of the object. Recipient(s) of the sensor-sharing message ($V_{remote}$) may use information to determine maneuvers and/or coordination with other vehicle(s).

Referring to FIGS. 4-5, in a sixth implementation example, the communication device (e.g., V2X-capable RSU) detects a VRU proximate to the road using its on-board sensors. RSU transmits a sensor-sharing message including the detected characteristics of the VRU. Recipient(s) of the sensor-sharing message ($V_{remote}$) may use information to determine maneuvers and/or coordination with other vehicle(s).

Figure 12:
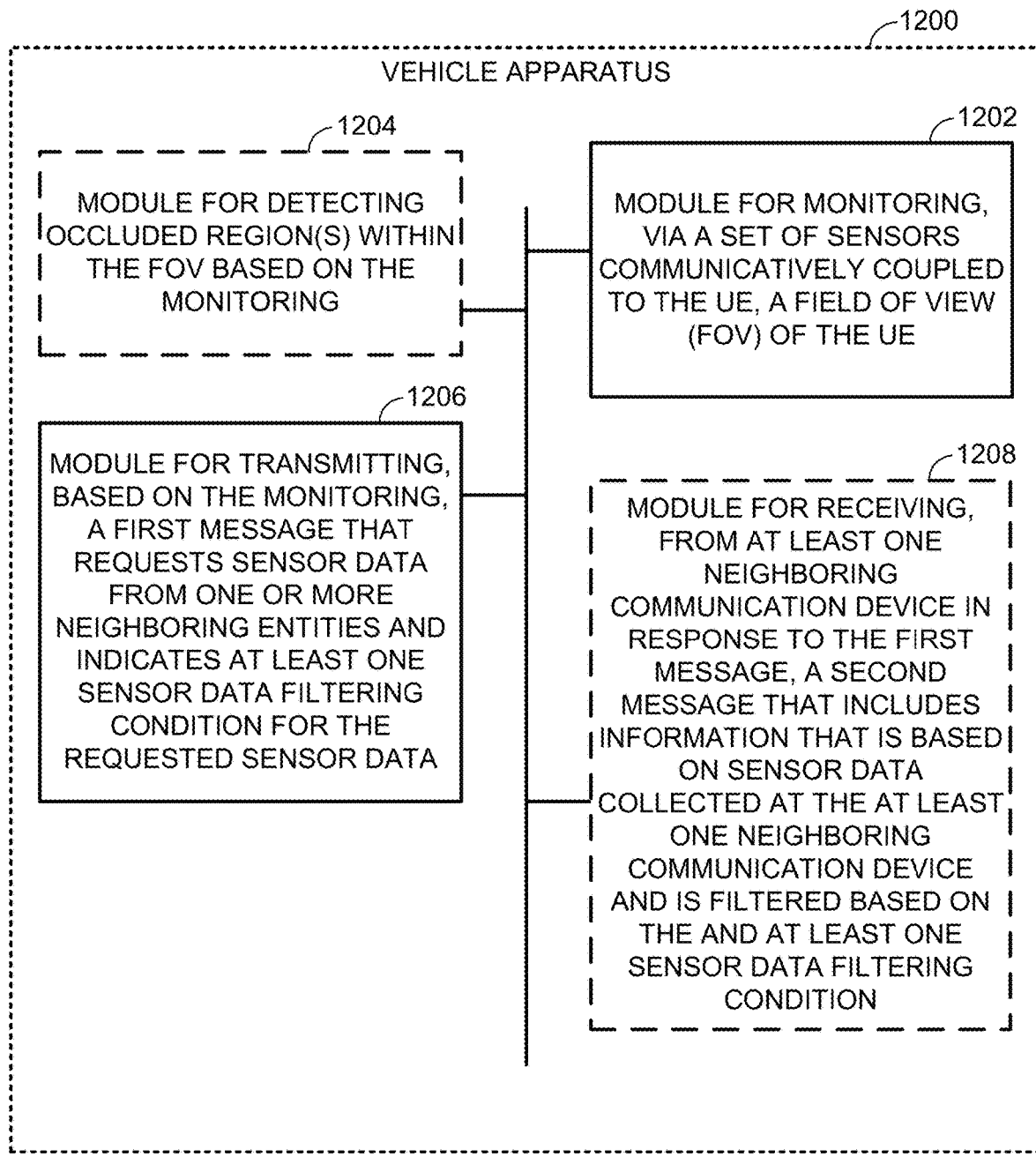
FIG. 12 illustrates an example vehicle apparatus for implementing the process of FIG. 4 represented as a series of interrelated functional modules in accordance with an aspect of the disclosure.

FIG. 12 illustrates an example vehicle apparatus 1200 for implementing the process 400 of FIG. 4 represented as a series of interrelated functional modules in accordance with an aspect of the disclosure. In the illustrated example, the apparatus 1200 includes a module for monitoring 1202, an optional module for detecting 1204, a module for transmitting 1206, and an optional module for receiving 1208.

The module for monitoring 1202 may be configured to monitor via a set of sensors communicatively coupled to the vehicle apparatus, a field of view (FOV) of the vehicle apparatus (e.g., 410 of FIG. 4). The optional module for detecting 1204 may be configured to detect at least one occluded region within the FOV based on the monitoring (e.g., 420 of FIG. 4). The module for transmitting 1206 may be configured to transmit, based on the monitoring, a first message that requests sensor data from one or more neighboring communication devices and indicates at least one sensor data filtering condition for the requested sensor data (e.g., 430 of FIG. 4). The module for receiving 1208 may be configured to receive, from at least one of the one or more neighboring communication devices in response to the first message, a second message that includes information that is based on sensor data collected at the respective neighboring communication device and is filtered based on the at least one sensor data filtering condition (e.g., 440 of FIG. 4).

Figure 13:
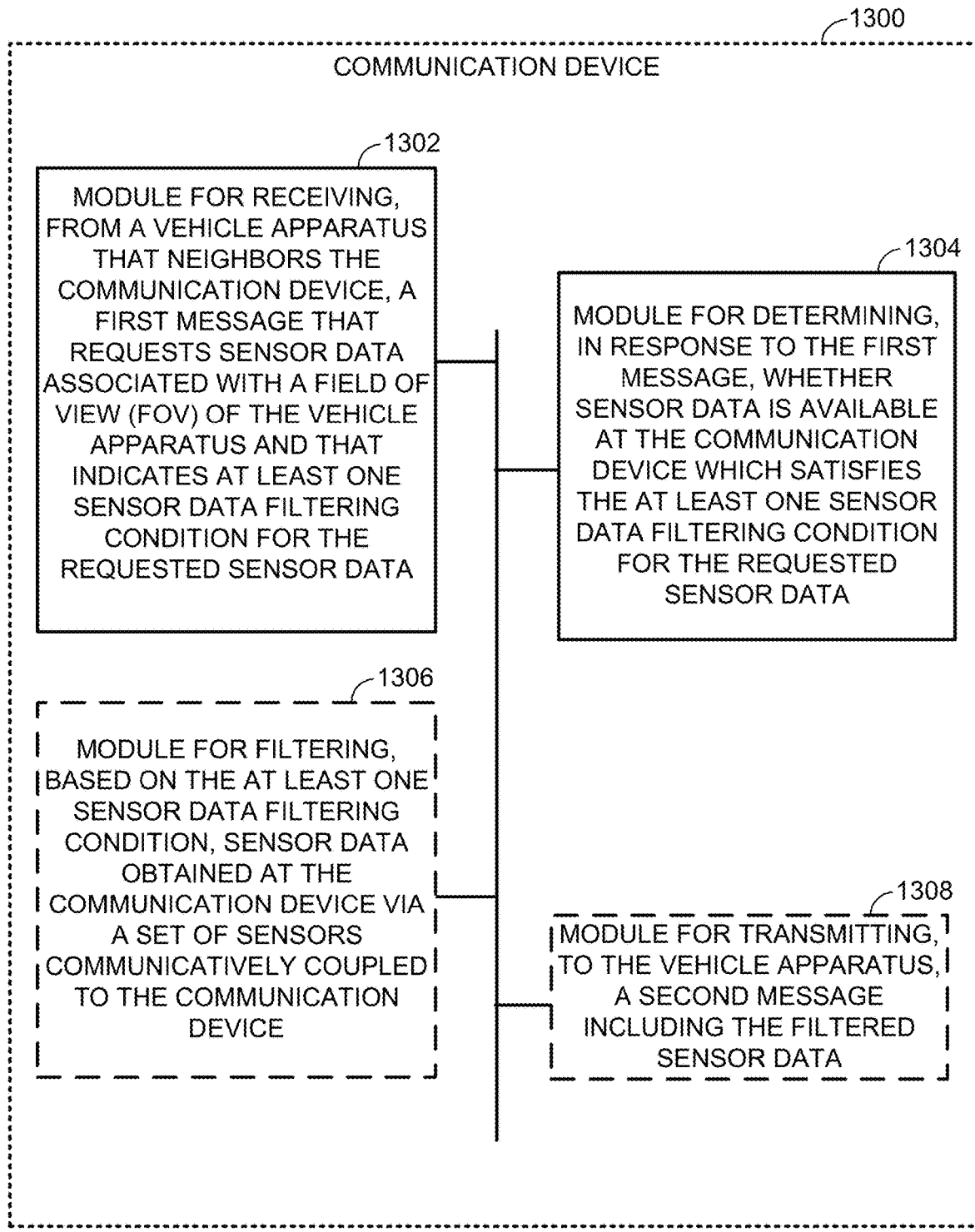
FIG. 13 illustrates an example apparatus for implementing the process of FIG. 5 represented as a series of interrelated functional modules in accordance with an aspect of the disclosure.

FIG. 13 illustrates an example communication device 1300 for implementing the process 500 of FIG. 5 represented as a series of interrelated functional modules in accordance with an aspect of the disclosure. In the illustrated example, the communication device 1300 includes a module for receiving 1302, a module for determining 1304, an optional module for filtering 1306, and an optional module for transmitting 1308.

The module for monitoring 1302 may be configured to receive, from a vehicle apparatus that neighbors the communication device, a first message that requests sensor data associated with a FOV of the vehicle apparatus and that indicates at least one sensor data filtering condition for the requested sensor data (e.g., 510 of FIG. 5). The module for determining 1302 may be configured to determine, in response to the first message, whether sensor data is available at the communication device which satisfies the at least one sensor data filtering condition for the requested sensor data (e.g., 520 of FIG. 5). The optional module for filtering 1306 may be configured to filter, based on the at least one sensor data filtering condition, sensor data obtained at the communication device via a set of sensors communicatively coupled to the communication (e.g., 530 of FIG. 5). The optional module for transmitting 1308 may be configured to transmit, to the vehicle apparatus, the filtered sensor data from optional block 530.

The functionality of the modules of FIGS. 12-13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 12-13, as well as other components and functions described herein, may be implemented using any suitable means. Such means also may be implemented, at least in part, using corresponding structure as taught herein. For example, the components described above in conjunction with the "module for" components of FIGS. 12-13 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well as in sequences of actions that may be represented by pseudocode. For example, the components and functions represented by FIGS. 12-13 may include code for performing a LOAD operation, a COMPARE operation, a RETURN operation, an IF-THEN-ELSE loop, and so on.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a vehicle apparatus, comprising: monitoring, via a set of sensors communicatively coupled to the vehicle apparatus, a field of view (FOV) of the vehicle apparatus; and transmitting, based on the monitoring, a first message that requests sensor data from one or more neighboring devices and indicates at least one sensor data filtering condition for the requested sensor data.

Clause 2. The method of clause 1, wherein the at least one sensor data filtering condition specifies at least one region where sensor data is desired, or wherein the at least one sensor data filtering condition specifies at least one region where sensor data is not desired, or a combination thereof.

Clause 3. The method of clause 2, further comprising: detecting a first occluded region within the FOV based on the monitoring, wherein the at least one sensor data filtering condition for the requested sensor data includes an indication of the first occluded region as a region where sensor data is desired.

Clause 4. The method of clause 3, wherein the first occluded region corresponds to a 2D region or 3D region, or wherein the first occluded region is based on one or more angular ranges relative to one or more reference points, or any combination thereof.

Clause 5. The method of any of clauses 3 to 4, further comprising: detecting a second occluded region within the FOV of the vehicle apparatus based on the monitoring, wherein the at least one sensor data filtering condition for the requested sensor data includes an indication of the second occluded region as another region where sensor data is desired.

Clause 6. The method of any of clauses 1 to 5, further comprising: receiving, from at least one of the one or more neighboring communication devices in response to the first message, a second message that includes information that is based on sensor data collected at the at least one neighboring communication device and is filtered based on the at least one sensor data filtering condition.

Clause 7. The method of clause 6, wherein, relative to a vehicle associated with the vehicle apparatus, the at least one neighboring communication device is associated with a neighboring vehicle, a neighboring vulnerable road user (VRU), or a neighboring roadside unit (RSU).

Clause 8. The method of any of clauses 1 to 7, wherein the transmitting transmits the first message via a vehicle-to-vehicle (V2V) protocol or vehicle-to-everything (V2X) protocol.

Clause 9. The method of any of clauses 1 to 8, wherein the first message is an application-layer message.

Clause 10. A method of operating a communication device, comprising: receiving, from a vehicle apparatus that neighbors the communication device, a first message that requests sensor data associated with a field of view (FOV) of the vehicle apparatus and that indicates at least one sensor data filtering condition for the requested sensor data; and determining, in response to the first message, whether sensor data is available at the communication device which satisfies the at least one sensor data filtering condition for the requested sensor data.

Clause 11. The method of clause 10, wherein the at least one sensor data filtering condition specifies at least one region where sensor data is desired, or wherein the at least one sensor data filtering condition specifies at least one region where sensor data is not desired, or a combination thereof.

Clause 12. The method of clause 11, wherein the at least one sensor data filtering condition for the requested sensor data includes an indication of a first occluded region as a region where sensor data is desired.

Clause 13. The method of clause 12, wherein the first occluded region corresponds to a 2D region or 3D region, or wherein the first occluded region is based on one or more angular ranges relative to one or more reference points, or any combination thereof.

Clause 14. The method of any of clauses 12 to 13, wherein the at least one sensor data filtering condition for the requested sensor data further includes an indication of a second occluded region as another region where sensor data is desired.

Clause 15. The method of any of clauses 10 to 14, wherein the determining determines that sensor data is available at the communication device which satisfies the at least one sensor data filtering condition for the requested sensor data, further comprising: filtering, based on the at least one sensor data filtering condition, sensor data obtained at the communication device via a set of sensors communicatively coupled to the communication device; and transmitting, to the vehicle apparatus, a second message including the filtered sensor data.

Clause 16. The method of clause 15, wherein the transmitting transmits the second message via a vehicle-to-vehicle (V2V) protocol or vehicle-to-everything (V2X) protocol.

Clause 17. The method of any of clauses 10 to 16, wherein the first message is an application-layer message.

Clause 18. The method of any of clauses 10 to 17, wherein, relative to a vehicle associated with the vehicle apparatus, the communication device is associated with a neighboring vehicle, a neighboring vulnerable road user (VRU), or a neighboring roadside unit (RSU).

Clause 19. The method of any of clauses 10 to 18, wherein the request for the sensor data and the at least one sensor data filtering condition is included in the first message expressly.

Clause 20. The method of any of clauses 10 to 19, wherein the request for the sensor data and the at least one sensor data filtering condition is included in the first message implicitly.

Clause 21. The method of clause 20, wherein the first message comprises a location of the vehicle apparatus, further comprising: detecting at least one occluded region in the FOV of the vehicle apparatus based on the location of the vehicle apparatus, wherein the detected at least one occluded region is interpreted by the communication device as an implicit request for sensor data in the at least one occluded region.

Clause 22. The method of any of clauses 20 to 21, wherein the first message comprises sensor data that depicts at least part of the FOV of the vehicle apparatus, further comprising: detecting at least one occluded region in the FOV of the vehicle apparatus based on the sensor data in the first message, wherein the detected at least one occluded region is interpreted by the communication device as an implicit request for sensor data in the at least one occluded region.

Clause 23. An apparatus comprising a memory and at least one processor communicatively coupled to the memory, the memory and the at least one processor configured to perform a method according to any of clauses 1 to 22.

Clause 24. An apparatus comprising means for performing a method according to any of clauses 1 to 22.

Clause 25. A non-transitory computer-readable medium storing computer-executable instructions, the computer-executable comprising at least one instruction for causing a computer or processor to perform a method according to any of clauses 1 to 22.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

The invention claimed is:

1. A method of operating a vehicle apparatus, comprising:
monitoring, via a set of sensors communicatively coupled to the vehicle apparatus, a field of view (FOV) of the vehicle apparatus;
detecting a first occluded region within the FOV based on the monitoring;
transmitting, based on the monitoring, a first message that requests sensor data from one or more neighboring devices and indicates at least one sensor data filtering condition for the requested sensor data and comprises an image captured from a camera of the vehicle apparatus; and
receiving, from at least one of the one or more neighboring communication devices in response to the first message, a second message that includes information that is based on sensor data collected at the at least one neighboring communication device and is filtered based on the at least one sensor data filtering condition; and
implementing one or more Advanced Driver Assistance System (ADAS) actions or one or more Automated Driving System (ADS) actions based on the information of the second message,
wherein the at least one sensor data filtering condition for the requested sensor data comprises image data that depicts at least the first occluded region within the FOV, and wherein the one or more ADAS or ADS actions comprise controlling at least one of steering or braking.

2. The method of claim 1, wherein the first occluded region corresponds to a 2D region or 3D region.

3. The method of claim 1, further comprising:
detecting a second occluded region within the FOV of the vehicle apparatus based on the monitoring,
wherein the at least one sensor data filtering condition for the requested sensor data includes an indication of the second occluded region as another region where sensor data is desired.

4. The method of claim 1, wherein, relative to a vehicle associated with the vehicle apparatus, the at least one neighboring communication device is associated with a neighboring vehicle, a neighboring vulnerable road user (VRU), or a neighboring roadside unit (RSU).

5. The method of claim 1, wherein the transmitting transmits the first message via a vehicle-to-vehicle (V2V) protocol or vehicle-to-everything (V2X) protocol.

6. The method of claim 1, wherein the first message is an application-layer message.

7. A vehicle apparatus, comprising:
a memory;
a communication interface; and
at least one processor communicatively coupled to the memory and the communication interface,
the at least one processor configured to:
monitor, via a set of sensors communicatively coupled to the vehicle apparatus, a field of view (FOV) of the vehicle apparatus;
detect a first occluded region within the FOV based on the monitoring; and
cause the communication interface to transmit, based on the monitoring, a first message that requests sensor data from one or more neighboring devices and indicates at least one sensor data filtering condition for the requested sensor data and comprises an image captured from a camera of the vehicle apparatus; and
cause the communication interface to receive, from at least one of the one or more neighboring communication devices in response to the first message, a second message that includes information that is based on sensor data collected at the at least one neighboring communication device and is filtered based on the at least one sensor data filtering condition; and
implement one or more Advanced Driver Assistance System (ADAS) actions or one or more Automated Driving System (ADS) actions based on the information of the second message,
wherein the at least one sensor data filtering condition for the requested sensor data comprises image data that depicts at least the first occluded region within the FOV, and wherein the one or more ADAS or ADS actions comprise controlling at least one of steering or braking.

8. The vehicle apparatus of claim 7, wherein the at least one processor is further configured to:
detect a second occluded region within the FOV of the vehicle apparatus based on the monitoring,
wherein the at least one sensor data filtering condition for the requested sensor data includes an indication of the second occluded region as another region where sensor data is desired.

* * * * *